United States Patent
Schmit et al.

(10) Patent No.: US 6,200,468 B1
(45) Date of Patent: Mar. 13, 2001

(54) AERATION SYSTEM APPARATUS WITH SOURCE OF IN SITU CLEANING AGENT AND PRESSURE MONITORING CONNECTION FOR SUBMERGED DIFFUSER

(75) Inventors: Frank L. Schmit, Port Washington; Lloyd Ewing, Milwaukee; David T. Redmon, Racine, all of WI (US)

(73) Assignee: Sanitaire Corporation, Brown Deer, WI (US)

(*) Notice: Subject to any disclaimer, the term of this patent is extended or adjusted under 35 U.S.C. 154(b) by 0 days.

(21) Appl. No.: 08/272,527

(22) Filed: Jul. 11, 1994

Related U.S. Application Data

(63) Continuation of application No. 07/420,245, filed on Oct. 12, 1989, now Pat. No. 5,328,601, which is a continuation of application No. 06/698,973, filed on Feb. 6, 1985, now Pat. No. 4,889,620, which is a continuation of application No. 06/426,041, filed on Sep. 28, 1982, now abandoned, which is a division of application No. 06/203,834, filed on Nov. 4, 1980, now Pat. No. 4,382,867, which is a continuation-in-part of application No. 06/191,974, filed on Sep. 29, 1980, now abandoned.

(51) Int. Cl.[7] .................. B08B 3/00; C02F 3/20

(52) U.S. Cl. .......... 210/137; 210/205; 210/221.2; 210/199; 134/170; 134/171

(58) Field of Search .................. 210/137, 205, 210/206, 221.2, 741, 764, 749, 754, 758, 759, 760, 199, 220; 261/121.1, DIG. 70; 134/170, 3, 18, 22.12, 22.18, 28, 171

(56) References Cited

U.S. PATENT DOCUMENTS 4,889,620 * 12/1989 Schmit et al. ............... 210/137

* cited by examiner

Primary Examiner—Chester T. Barry
(74) Attorney, Agent, or Firm—Hall, Priddy, Myers & Vande Sande

(57) ABSTRACT

A liquid treatment apparatus comprising a gas distribution network in a water impound; a device for introducing treating gas into the network; a source of cleaning agent; a device for intermittently introducing the cleaning agent into the network alone or in admixture with the treating gas; a plurality of synthetic thermoplastic or thermoset resin plenums; a plurality of a least ten diffusion elements sealingly engaged and in communication with the plenums for receiving the treating gas and cleaning agent, the elements having air diffusion pores extending therethrough, but being free of through-holes other than air diffusion pores, the pores defining paths for discharge of the treating gas and cleaning agent and which exhibit an increase in dynamic wet pressure and/or bubble release pressure as a result of deposition of foulants; retaining ring engaging the diffusion elements about their peripheries for securing the elements to the plenums; sealing device adjacent the peripheries of the diffusion elements for preventing leakage of air from the plenums past the peripheries of the elements; and measuring device for monitoring the operation of the liquid treatment apparatus by measuring changes in operating parameters of the apparatus that indicate dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of the elements.

24 Claims, 12 Drawing Sheets

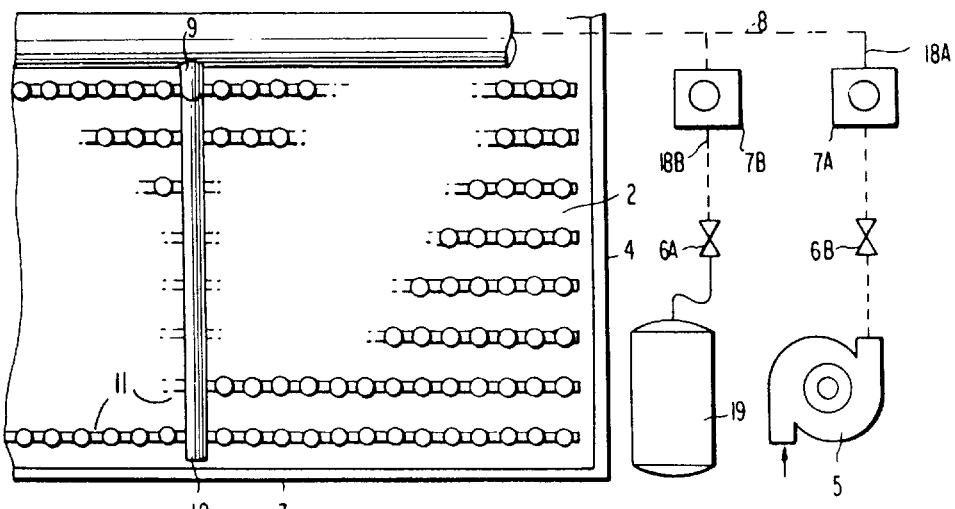
FIG.1
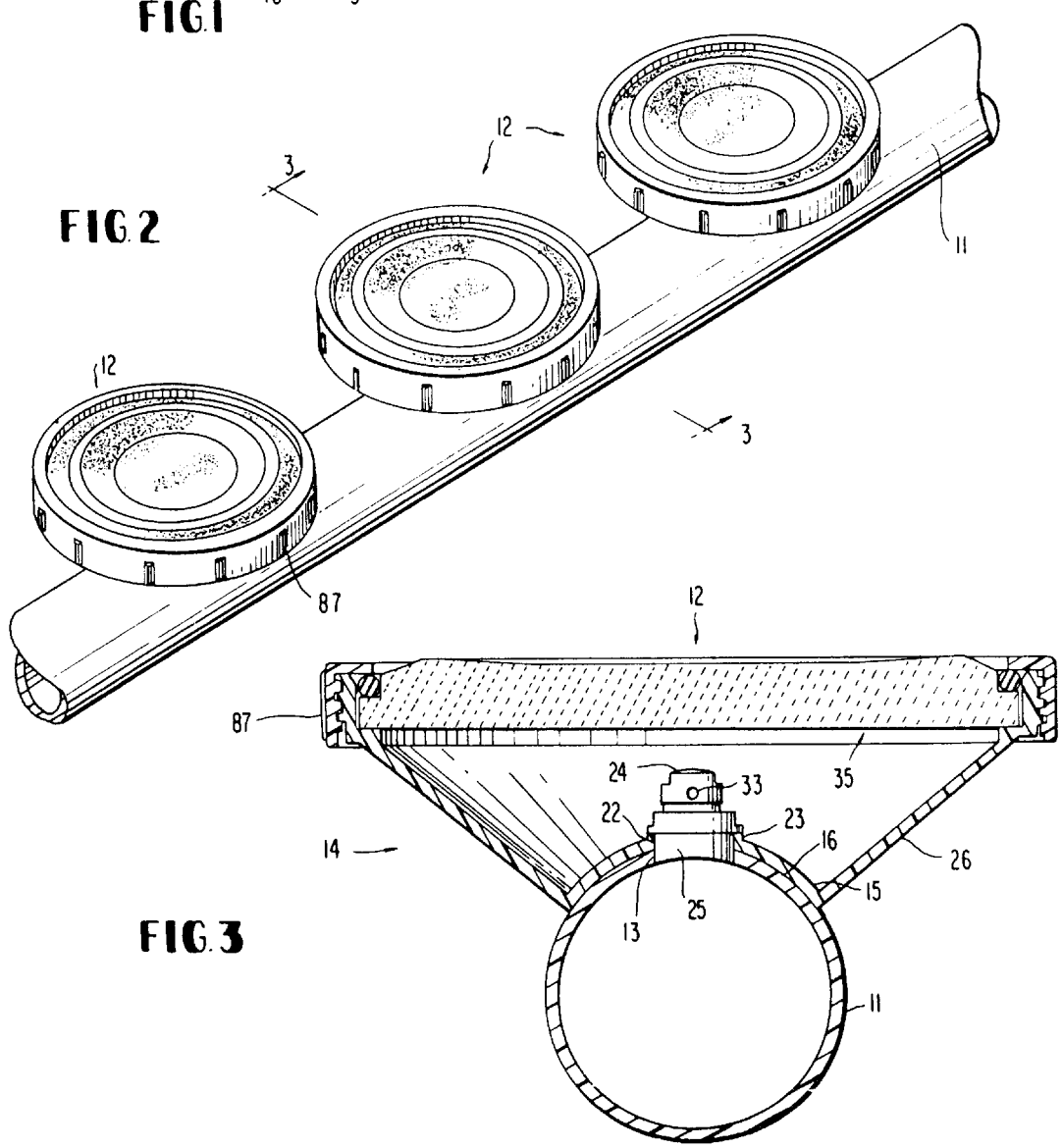
FIG.2
FIG.3

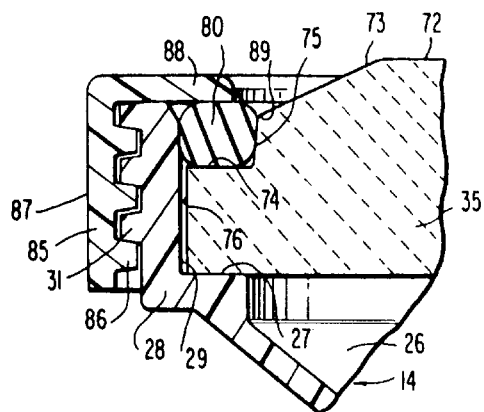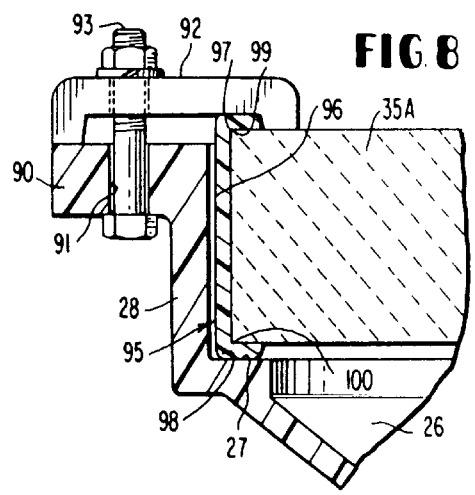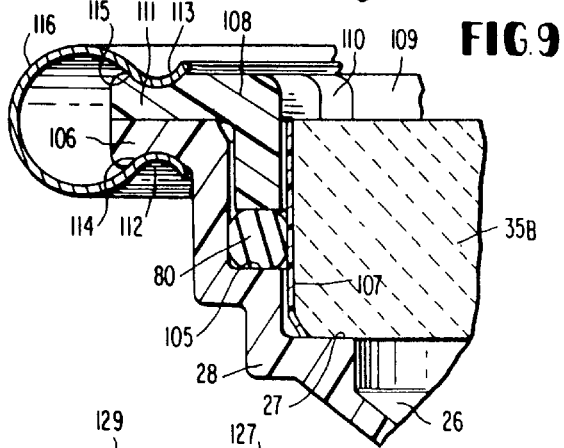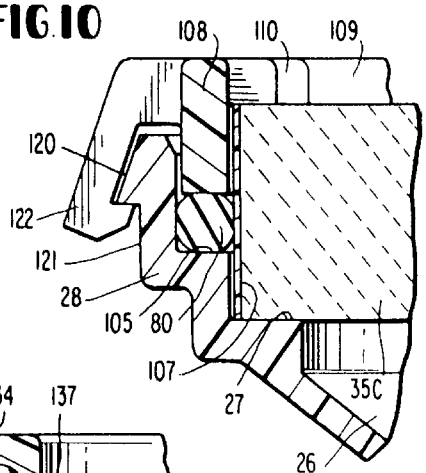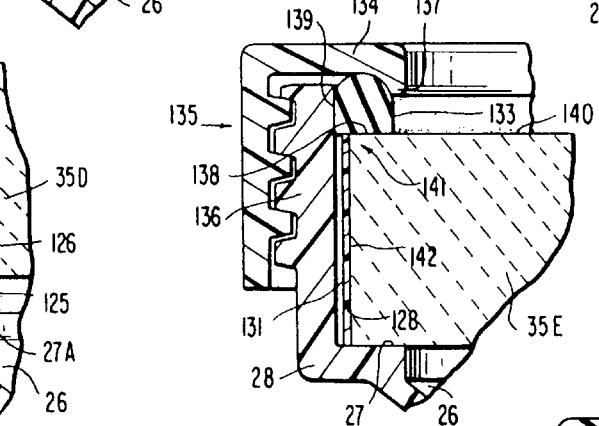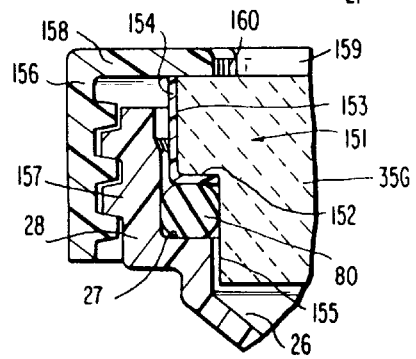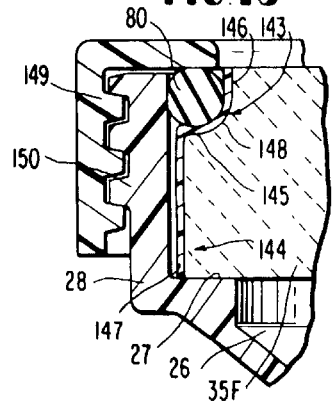

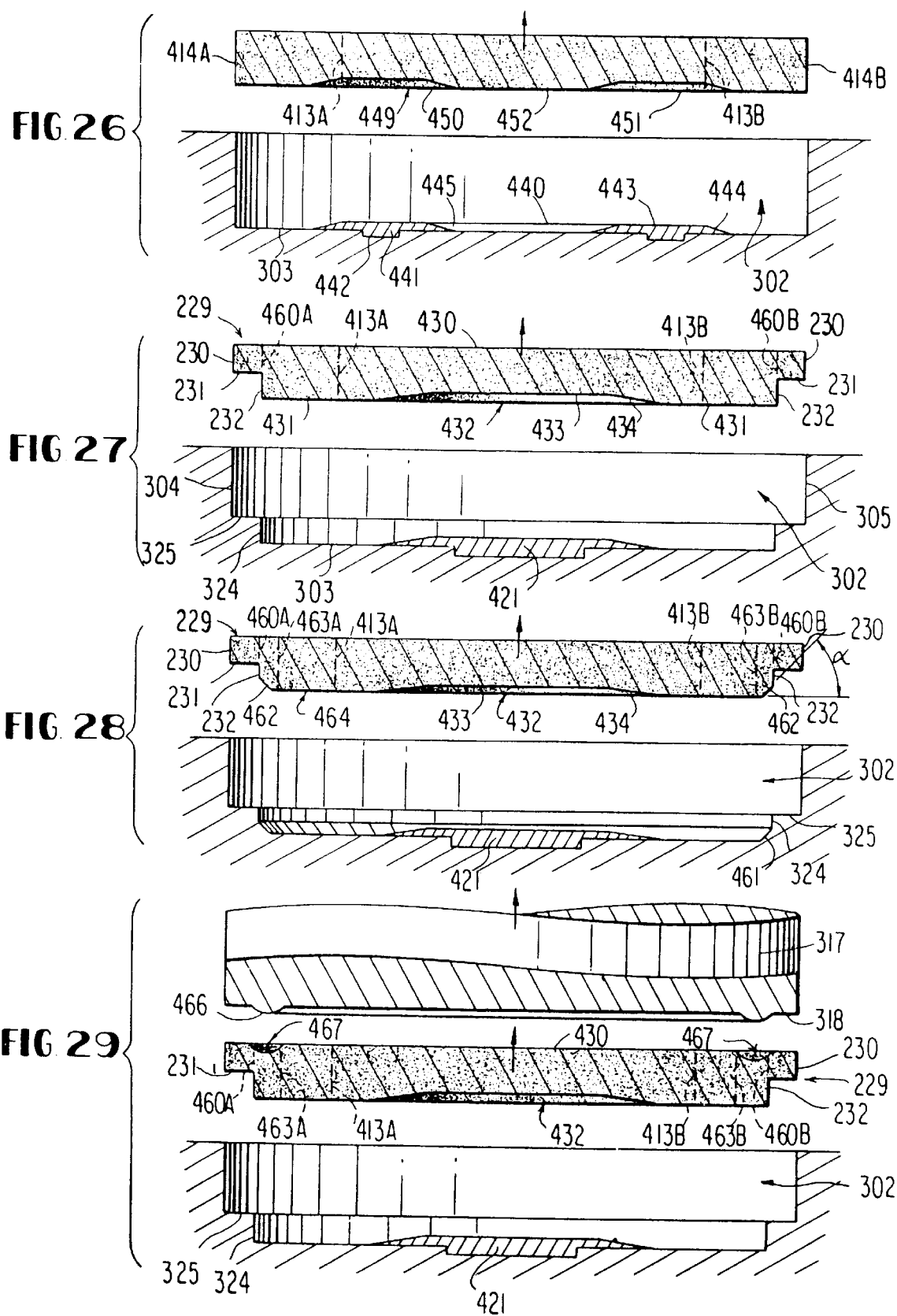

AERATION SYSTEM APPARATUS WITH SOURCE OF IN SITU CLEANING AGENT AND PRESSURE MONITORING CONNECTION FOR SUBMERGED DIFFUSER

CROSS REFERENCES TO RELATED APPLICATIONS

This application is a continuation of application Ser. No. 07/420,245 filed Oct. 12, 1989, now U.S. Pat. No. 5,328,601, which is a continuation of application Ser. No. 06/698,973 filed Feb. 6, 1985, now U.S. Pat. No. 4,889,620, which is a continuation of application Ser. No. 06/426,041 filed Sep. 28, 1982, now abandoned, which is a division of application Ser. No. 06/203,834 filed Nov. 4, 1980, now U.S. Pat. No. 4,382,867, which is a continuation-in-part of Ser. No. 06/191,974 filed Sep. 29, 1980, now abandonded.

This application hereby claims the benefits of 35 U.S.C. 120 with respect to U.S. patent applications Ser. Nos. 420,245; 698,973; 426,041; 203,834 and 191,974, more fully identified below. This application is a continuation with respect to the aforementioned U.S. patent applications Ser. Nos. 420,245; 698,973; 426,041; and 203,834, and is a continuation-in-part with respect to the foregoing Ser. No. 191,974. Ser. No. 420,245, filed Oct. 12, 1989, now pending, will issue as U.S. Pat. No. 5,328,601 on Jul. 12, 1994 and was a continuation of Ser. No. 698,973. Serial No. 698,973, filed Feb. 6, 1985, now U.S. Pat. No. 4,889,620, issued Dec. 26, 1989, was a continuation of Ser. No. 426,041, filed Sep. 28, 1982, now abandoned, which was a division of Ser. No. 203,834, filed Nov. 4, 1980, now U.S. Pat. No. 4,382,867, which was a continuation-in-part of Ser. No. 191,974, filed Sep. 29, 1980, now abandoned. This application hereby incorporates by reference the entire subject matters of U.S. patent applications Ser. Nos. 420,245 and 698,973, which in turn incorporates by reference the entire subject matter of U.S. patent application Ser. No. 191,974.

With respect to these incorporations by reference of "subject matter" disclosed therein, we do not intend to incorporate by reference any claims to domestic priority under 35 U.S.C. §120 which may be found in those applications. Rather, we rely on only those claims to domestic priority expressly set forth above.

FIELD OF THE INVENTION

The present invention relates to the treatment of liquid media containing organic and/or inorganic foulants. More particularly the invention relates to the cleaning of multipore diffusion elements while submerged in liquid media including such foulants.

BACKGROUND OF THE INVENTION

The aeration of waste liquid media, including for example domestic sewage and industrial waste waters, is an old art. The activated sludge process, which includes aeration of liquors containing domestic sewage, has been in continuous use for about sixty years.

The liquid media treated in such aeration processes very commonly contain organic and/or inorganic foulants such as for example relatively insoluble salts which are responsible for the hardness of the water, and living and non-living organic residues which contribute to the formation of scales and slimes. Upon aeration of these media with submerged aeration devices, there is a tendency for the foulants to progressively foul such devices at the point of release of oxygen-containing gas into the liquid media, closing up or otherwise modifying the openings through which the oxygen-containing gas is released into the media with various undesirable results.

Such fouling can impair the uniformity of gas distribution from aeration devices, especially when such devices are of the area discharge type, such as for example the flat porous ceramic plates which were used to discharge air into sewage liquors in early activated sludge plants. Also, fouling can in certain circumstances increase the pressure differential required to drive oxygen-containing gas through the aeration devices at a given flow rate, thus either reducing the flow of oxygen available, and therefore the oxygen transfer rate of the aeration system, and/or increasing the amount of power consumed in maintaining the desired rate of flow, thus substantially increasing the energy requirements and cost of the process.

Since these fouling phenomena are often progressive in nature they can eventually lead to a complete or near complete disablement of the aerating devices if permitted to continue long enough. Accordingly, it is a goal of the present invention to provide methods and apparatuses for effectively monitoring the status of the aeration devices while in operation, and particularly, the dynamic wet pressure of operating aeration devices.

SUMMARY OF INVENTION

The present invention includes several aspects of a liquid treatment apparatus. In one such aspect, the invention provides a liquid treatment apparatus comprising a gas distribution network in a tank and means for introducing treating gas into the network. The apparatus includes a source of cleaning agent; means including valve means for intermittently introducing into the network the cleaning agent alone or in admixture with the treating gas; a plurality of synthetic thermoplastic or thermoset resin plenums; a plurality of flow regulators distributed about a submerged portion of the network for receiving the aforementioned treating gas and cleaning agent and for discharging them into the plurality of plenums downstream of the flow regulators, a plurality comprising at least ten diffusion elements sealingly engaged and in communication with the plenums for receiving the treating gas and cleaning agent, the elements having air diffusion pores extending therethrough, but being free of through-holes other than air diffusion pores, each of the diffusion elements being in communication with its own individual flow regulator through its own individual plenum downstream of the flow regulator for tending to promote gas flow through the diffusion elements at similar rates, the pores defining paths for discharge of the treating gas and cleaning agent and which exhibit an increase in dynamic wet pressure and/or bubble release pressure as a result of deposition of foulants; retaining means engaging the diffusion elements about their peripheries for securing the elements to the plenums; sealing means adjacent the peripheries of the diffusion elements for preventing leakage of air from the plenums past the peripheries of the elements; and measuring devices for monitoring the operation of the liquid treatment apparatus by measuring changes in operating parameters of the apparatus that indicate dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of the elements.

A further embodiment of the first aspect of the invention includes measuring devices comprises devices for measuring pressure across or flow of gas through one or more diffusion elements; devices for measuring said changes with sufficient precision to maintain the dynamic wet pressure across the diffusion elements in a range not to exceed about 15 inches of water gauge above said base condition; and devices for measuring the hydrostatic pressure of said liquid at about the elevation of the diffusion elements, devices for measuring gas pressure within a plenum downstream of a flow-regulating means, and devices for measuring the gas pressure within a header supplying gas to said flow regulating devices.

Still further embodiments of the first aspect of the invention include apparatuses wherein the diffusion elements are divided into at least two groups and including at least one measuring device, the device includes at least one flow measuring device capable of measuring the respective flow or flows of gas through at least one selected group among the at least two groups, and the apparatus includes at least one controlling device capable of controlling flow of cleaning agent to one or more of the selected groups; apparatuses wherein the at least one controlling device is capable of passing cleaning agent to one or more of the selected groups with a flow which differs from the flow of cleaning agent, if any, to one or more other groups among the at least two groups; apparatuses wherein said at least one measuring device includes at least one pressure measuring device capable of measuring the respective pressure or pressures of gas flowing through at least one selected group among said at least two groups, and the at least one controlling device is capable of controlling flow of cleaning agent to one or more of said selected groups in response to measurements made by said measuring device; and apparatuses wherein the sealing means, retaining means and plenums jointly restrain vertical movement of said diffusion elements.

In a second aspect, the invention provides a liquid treatment apparatus comprising a gas distribution network in a tank and means for introducing treating gas into the network. The apparatus includes a source of cleaning agent; means including valve means for intermittently introducing into the network the cleaning agent alone or in admixture with the treating gas; a plurality of synthetic thermoplastic or thermoset resin plenums; a plurality comprising at least hundreds of diffusion elements sealingly engaged and in communication with the plenums for receiving the treating gas and cleaning agent, the elements having air diffusion pores extending therethrough, but being free of through-holes other than air diffusion pores, the pores defining paths for discharge of the treating gas and cleaning agent and which exhibit an increase in dynamic wet pressure and/or bubble release pressure as a result of deposition of foulants; retaining means engaging the diffusion elements about their peripheries for securing the elements to the plenums; sealing means adjacent the peripheries of the diffusion elements for preventing leakage of air from the plenums past the peripheries of the elements; and measuring means for monitoring the operation of the liquid treatment apparatus by measuring changes in operating parameters of the apparatus that indicate dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of the elements.

Another embodiment of the second aspect of the invention includes a plurality of flow regulating means distributed about a submerged portion of the network for receiving the aforementioned treating gas and cleaning agent and for discharging them into a plurality of plenums downstream of the flow regulating means. The flow regulating means tend to promote flow into said plenums at similar rates. Each of the diffusion elements is in communication with its own individual flow regulating means through its own individual plenum downstream of the flow regulating means for tending to promote gas flow through the diffusion elements at similar rates.

Further embodiments of the second aspect of the invention include measuring means comprises means for measuring pressure across or flow of gas through one or more diffusion elements; means for measuring said changes with sufficient precision to maintain the dynamic wet pressure across the diffusion elements in a range not to exceed about 15 inches of water gauge above said base condition; and means for measuring the hydrostatic pressure of said liquid at about the elevation of the diffusion elements, means for measuring gas pressure within a plenum downstream of a flow-regulating means, and means for measuring the gas pressure within a header supplying gas to said flow regulating means.

Still further embodiments of the second aspect of the invention include apparatuses wherein the diffusion elements are divided into at least two groups and including at least one measuring means, the means includes at least one flow measuring means capable of measuring the respective flow or flows of gas through at least one selected group among the at least two groups, and the apparatus includes at least one controlling means capable of controlling flow of cleaning agent to one or more of the selected groups; apparatuses wherein the at least one controlling means is capable of passing cleaning agent to one or more of the selected groups with a flow which differs from the flow of cleaning agent, if any, to one or more other groups among the at least two groups; apparatuses wherein said at least one measuring means includes at least one pressure measuring means capable of measuring the respective pressure or pressures of gas flowing through at least one selected group among said at least two groups, and the at least one controlling means is capable of controlling flow of cleaning agent to one or more of said selected groups in response to measurements made by said measuring means; and apparatuses wherein the sealing means, retaining means and plenums jointly restrain vertical movement of said diffusion elements.

Many possible variations of the invention which are also considered to be inventions in their own right are disclosed in conjunction with various and preferred embodiments discussed below and/or shown in the accompanying drawings. On the other hand, the invention can be embodied in an even wider variety of forms than can be specifically discussed and illustrated herein. Thus, the various and preferred embodiments and examples set forth in the text which follows and in the accompanying drawings are to be regarded as illustrative and not limiting with respect to the scope of invention.

BRIEF DESCRIPTION OF THE DRAWINGS

FIG. 1 is a fragmentary view of a sewage aeration system including a sewage aeration tank, an air supply main, means for introducing a mixture of aeration gas and cleaning gas into said air supply main, a downcomer pipe, distribution pipes, header pipes and diffusers.

FIG. 2 is a perspective view of a section of header pipe and diffusers of FIG. 1.

FIG. 3 is a vertical transverse cross section of the header pipe and one of the diffusers of FIG. 2 taken on section line 3—3 of FIG. 2.

FIG. 7 is an enlarged portion of FIG. 3 showing the peripheral edge of the diffusion element in transverse cross section, along with portions of the plenum, retaining means and sealing means.

FIGS. 8 to 14 show the same portion of the apparatus as FIG. 7, but with varying modifications to the diffusion element retaining means and sealing means.

FIG. 20A is an enlarged portion of the probe of FIG. 20.

FIG. 20B is an enlarged and foreshortened portion of the element and bubble release pressure curve of FIG. 20.

FIGS. 21 through 29 are fragmentary, diagrammatic, transverse sectional views disclosing diffusion elements in accordance with the present invention and illustrative methods for manufacturing same.

VARIOUS AND PREFERRED EMBODIMENTS

Figure 4:
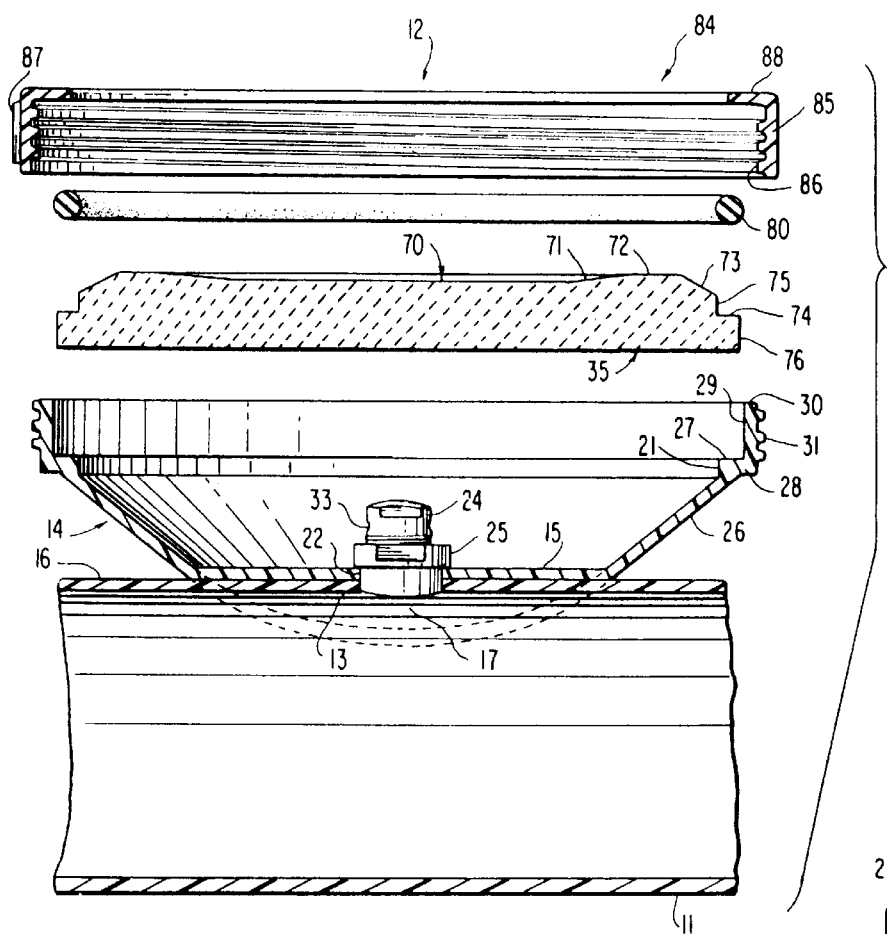
FIG. 4 is a longitudinal cross section of the diffuser and pipe of FIG. 3, the component parts of the diffuser being exploded for clarity.

Although the invention will most commonly be used in aeration systems for the biological treatment of wastewater, it is useful in the treatment of aqueous or non-aqueous liquids with or without biological and non-biological foulants. See the definition of foulants below.

Any suitable cleaning gas which is aggressive towards the foulants may be used as cleaning gas for purposes of the present invention. See the definition of cleaning gas below.

According to a particularly preferred embodiment of the invention, the treating gas is an oxygen-containing gas, especially air, the cleaning gas is hydrogen chloride gas (HCl), the liquid medium is wastewater containing domestic sewage, and the treatment facility is a tank-type activated sludge plant.

In typical sewage treatment plant operation, unrestrained deposition of foulants will normally cause a substantial increase in the dynamic wet pressure of the diffusion elements, or a substantial increase in the mean bubble release pressure of the elements, measured at the influent and/or effluent surface(s) of the elements, or a substantial increase in both of said pressures. For example, substantial deposits of foulants concentrated at the gas effluent surfaces of the diffusion elements may result in appreciable increases of both the dynamic wet pressure of the elements and the mean bubble release pressure measured at the effluent surfaces, while resulting in no change in bubble release pressure at the influent surfaces. Alternatively, minor deposits of foulants concentrated at the gas influent surfaces of the diffusion elements can result in appreciable increases in mean bubble release pressure at these influent surfaces, no change in bubble release pressure at the element effluent surfaces, and an increase in dynamic wet pressure across the elements which may be within the limits of experimental error of the dynamic wet pressure measuring technique and may therefore not be measurable in any practical sense. But major deposits of foulants concentrated at the influent surfaces can result in appreciable measurable increases in dynamic wet pressure, and in bubble release pressure at the influent surfaces, even if there were no measurable increase in bubble release pressure at the effluent surfaces.

The apparatus of the invention is useful in conducting cleaning in such a manner as to restrain formation of foulant deposits in the diffusion elements. Included in restraining are operations which prevent or retard the formation of such deposits or which remove at least a portion of accumulated deposits from time to time, whereby the extent of fouling of the diffusion elements is controlled. Thus, for example, cleaning gas may be applied with sufficient frequency to prevent any appreciable amount of deposits from forming, in which case it could be possible that no increase in either the dynamic wet pressure or the mean bubble release pressure of the elements would be observed. Another example of restraining would include treatment with cleaning gas with a frequency which was not effective to completely prevent the formation of appreciable deposits of foulants in the diffusion elements, but which was sufficient to discourage the growth of organic or other foulants and thereby maintain the dynamic wet pressure and/or mean bubble release pressure of the elements within one or more of the ranges set forth above over an extended cycle of operation. Also, at different times and under different conditions a given plant may be operated in any of the modes described above, i.e. the prevention, retardation or removal modes. Whether the apparatus is operated in the prevention, retardation or removal mode, the cleaning gas may be applied continuously or intermittently, including application at sporadic or periodic time intervals. Further information on gas cleaning operation may be found in column 10, line 11 through column 17, line 62, and in the related definitions of U.S. Pat. No. RE. 33,177.

One may employ various means for feeding treating gas and for continuously or periodically feeding aggressive mixtures of treating gas and cleaning gas. The treating gas may for example be fed with the usual compressor or blower and overall system pressure or flow control means familiar to those skilled in the art. The cleaning gas may be fed from a storage tank containing a substantial supply of said gas under high pressure via a conventional flow controller and measuring means. By a suitable connection with the means for feeding treating gas into the means which convey the treating gas into the liquid medium one may form the desired aggressive mixtures. Provision may be made for automatic control of the blending of the treating gas and cleaning gas and of the commencement of the feeding of the aggressive mixtures. According to a preferred embodiment, said distribution network also includes measuring means which are preferably, but not necessarily, located in a submerged portion of said tank, for measuring temperature, pressure and flow of gas through said network or through representative diffusion elements with sufficient precision for maintaining the dynamic wet pressure across the diffusion elements in a range not to exceed about 25 inches, more preferably about 15 inches or less, and still more preferably about 7 inches or less of water gauge above said base condition.

The gas distribution network may be constructed of any suitable material, including for instance, metallic, resin-lined metallic, and rigid resin pipe, including reinforced or unreinforced thermoplastic and thermoset resin pipe. It is desirable to transmit the cleaning gas to the diffusion elements through a portion of the above mentioned network which is formed of synthetic resinous material. Other portions of the network may be formed of other materials, including for example metallic conduits and fittings. According to a particularly preferred embodiment of the invention the cleaning gas is first brought into admixture with the treating gas at a submerged location in the network. This facilitates the use of metallic conduits in the non-submerged portions of the network, including for example those conduits, such as downcomer pipes, which convey the treating gas from a position above the surface of the liquid medium down into the liquid medium. Preferably, that portion of the gas distribution network which is exposed to the aggressive mixtures is composed of conduit having internal surfaces of acid resistant synthetic polymeric material. If one chooses a synthetic resinous pipe having a load bearing wall of polymeric material, which is preferred, it should have a tensile strength of about 2000 to about 60,000 psi, a flexural modulus of about $4 \times 10^4$ to about $4 \times 10^6$ psi and a pipe stiffness of about 10 to about 1000 psi, by ASTM D-2412. Preferably the conduit walls are formed of such synthetic polymeric materials as rigid polyvinyl chloride (PVC), acrylonitrile-butadiene-styrene (ABS) or other suitable resinous materials. These same materials may also be and preferably are embodied in the construction of the flow regulating means and diffusion element holders, although it should be understood that elastomeric materials resistant to the cleaning gases may be employed in certain of the flow regulating means and in the sealing means. Whatever materials are used should be chosen with due regard to resistance to corrosion, weather, collapse and impact. Suitable provision (not shown) should be made for expansion and contraction where necessary.

The flow regulator means may be at least in part integral or non-integral with the holders for the diffusion elements. Mounting of the flow regulators within or without the holders is acceptable, but the most convenient arrangement is within the holders and therefore such arrangement is preferred. The flow regulators employed in accordance with the invention may be of any desired type, such as passive and active flow regulator means, including those with varying pressure response characteristics. For instance, one may employ flow regulator means which respond exponentially to changes in pressure, such as for instance fixed orifices, or those which respond in a more linear fashion, such as for instance passages with large ratios of length to cross sectional area. Passages which change their cross-section in response to pressure changes are also contemplated, including those which can perform a valving function and those which are capable only of uni-directional flow.

The diffusion elements may be supported by suitable holders, each of which at least partly encloses a plenum (to be discussed below) and includes a supporting surface against which a peripheral surface portion of a diffusion element may be supportively engaged with the aid of restraining means and/or of sealing means (also to be discussed below). Among the known and acceptable types of holders are those which secure the elements about their peripheries, and a variety of preferred embodiments of such holders and of the sealing means for sealing the elements to the holders are disclosed below.

Although the plenum may be of any suitable material, it also is preferably of synthetic polymeric material, which may be reinforced and preferably has the physical properties described above in connection with the preferred pipe. The holders may be fashioned by any appropriate forming process, such as for instance, injection molding, lay up and spray up techniques.

The plenums through which the respective flow regulating means discharge gas to the gas influent surfaces of the diffusion elements are gas chambers defined by wall means which provide the gases with ready access, and an opportunity for relatively uniform distribution, to said influent surfaces. The plenums will normally be within the holders. Usually one or more walls of each plenum will be defined by the influent surface of the diffusion element itself and the other walls of the plenum will be defined by internal surfaces of the holder.

As suggested above, the holders as well as their respective retaining means can take a wide variety of forms, including those which secure the diffusion elements by direct or indirect contact about their entire peripheries, or at spaced points about their peripheries or at other locations. Among the applicable retaining means are, for example, those including clips, clamps and rings which clamp or merely restrain, secured to the plenum by bolts, hooks, threads and other fastening means.

Suitable sealing means may be fabricated from a wide variety of materials in a wide variety of forms. For example, one may employ various plastics and rubbery elastomers. The sealing means may be one or more members of circular, flat or other cross-section, including special profiles matched to the shape of the diffusion element and/or its support means. The requisite shapes can be produced by any suitable forming process, such as for instance extrusion, casting and other molding techniques.

The invention contemplates the use of sealing means which are adherent or attached to the diffusion elements, such as those which are clamped or bonded in place, and those which are not adherent or attached. Those sealing means which are neither adherent nor attached to the diffusion elements, and which are preferred in the present invention, are preferably held against the elements by the structure of the holder, by the structure of the retaining means described above, by the structure of the diffusion element itself, and preferably by a combination of the foregoing. Disposition of the sealing means adjacent the periphery of the diffusion element includes placement inside and/or outside the outline of the periphery of the element as viewed in plan view and at varying elevations above, below and/or along the side of the element, but the sealing means preferably makes contact with an upper edge of a vertical (including near vertical) side surface of the element as described in greater detail below.

A wide variety of diffusion elements may be employed, made of varying materials in varying configurations. In general the invention is practiced with multi-pore diffusion elements, members containing a multitude of closely spaced passages or pores of small diameter defining paths for the discharge of gases into liquid media. Such pores or passages may be of any suitable shape, size and length, their shape being determined to a certain extent by the method of producing the element. There are of course a variety of ways of forming diffusion elements and any suitable technique may be employed. For example a porous body may be formed by solidifying a shaped mixture of water-insoluble molten material and water soluble solid particles, followed by leaching out the soluble particles. Alternatively a porous member may be formed for example by building up layers of fabric formed from fibers or filaments. Preferably however the diffusion elements and their pores are formed by the bonding of solid particles together in a mass in which the pores are formed by the spaces extant between the bonded particles. The particles may be bonded with or without an adhesive or other bonding agent.

The elements may, for instance, be formed of organic or inorganic materials in particulate and/or fibrous forms. An exemplary organic material is particles of fusible polymeric material as disclosed in U.S. Pat. No. 3,970,731. Exemplary of inorganic materials are metal and ceramic powders, including for example, alumina, silica, mullite, and various clays. The finely divided materials are generally shaped and compacted under pressure, and, if necessary, heated or fired to fully develop the necessary coherency. Bonding with organic or inorganic binders is contemplated, and the finely divided particles and/or fibers may be bound together by organic adhesive bonds, ceramic or fusion bonding or sintering.

The diffusion elements may be formed in any useful shape. For example they may be formed in the shape of plates, defining a flat or curved surface. Among the applicable shapes are those which appear round, oval, square, rectangular, polygonal and irregular in plan view, and those which appear substantially horizontal in transverse cross section, including those which are truly flat and those which are only generally horizontal, in the sense of including non-horizontal surfaces but including a portion which extends in a generally horizontal direction. The elements may have plain vertical or inclined edges, with or without steps and the edge portions may include bevels, rounded portions, grooves and the like.

In general the applicable elements preferably have active gas discharge surfaces which are free of bubble emitting macro openings, such as those shown for instance in U.S. Pat. No. 3,970,731 to Oksmann. Preferably the element is such that it will emit fine bubbles from random locations throughout the gas discharge surface. Preferably the gas infusion surface of the element is free of air transmitting macro holes longer than 0.3 T wherein T is the average thickness of the element weighted on an area basis, or is free of such holes. A macro hole is an intentionally or unintentionally produced hole larger than that normally produced by compaction of the particulate material. It is beneficial if substantially all gas paths through the body of the element to its gas discharge surface, as installed in the plenum or other holder, are about the same length. Moreover, it is preferred to employ a diffusion element having a bubble release pressure in the range of about 2 to about 20, preferably about 3 to about 15 and more preferably about 4 to about 10 inches of water gauge. The optimum bubble release pressure is considered to be about 7 inches. The values given are for bubble release pressure in water of new elements as manufactured, i.e. prior to use. A technique for determining bubble release pressure and other preferred characteristics for the diffusion elements used in the present invention, are disclosed in the U.S. patent application Ser. No. 952,892 of Lloyd Ewing and David T. Redmon, entitled "Diffusion Element", filed in the U.S. Patent and Trademark Office, on Nov. 19, 1978, now U.S. Pat. No. 4,261,933, the entire disclosure of which is hereby incorporated herein by reference. It is also preferred to fabricate the element of hydrophilic materials, i.e. materials which are hydrophilic in the element as manufactured and prior to use. Also, preferably, the element is one whose sides, including for example extreme vertical edges and vertical or near vertical surfaces of steps near the periphery of the element, are porous, at least semi-permeable and free of adherent material preventing bubble emission. The preferred elements have a specific permeability when new of about 6 to about 200 SCFM at 2 inches of water gauge. The thickness of the elements may be uniform throughout or may vary when viewed in horizontal cross section. A particularly desirable characteristic of the preferred diffusion elements is that of relative uniformity of bubble release pressure throughout the gas effluent surfaces of the elements. Such uniformity may be attained in any suitable fashion, such as for example by the techniques disclosed in the above-mentioned U.S. patent.

In accordance with a particularly preferred embodiment the standard deviation of at least 5 bubble release pressure measurements taken along each of two perpendicular lines across the diffusion element effluent surface is less than 0.25 and preferably less than 0.05. The most preferred diffusion elements are those which are formed of sintered or bonded particles in accordance with the teachings of the aforesaid U.S. patent, and of the simultaneously filed U.S. patent application Ser. No. 952,862 of the said Ewing, Redmon and William H. Roche, now U.S. Pat. No. 4,261,932, the entire disclosure of which is hereby incorporated herein by reference. One may choose a diffusion element having any one or all of the above preferred characteristics.

Irrespective of the particular form of holder and diffusion element arrangement adopted, it is preferred that the element be so supported that all portions thereof which emit air to the surrounding liquid may have ready access to replacement water, to maintain such emitting portions in contact with water and subject to the influence of surface tension. Thus, it is preferred to avoid a situation in which a side surface of the element is adjacent to a crevice which can be swept clear and kept clear of water by the air discharged from the side surface. The air emanating from the element adjacent said crevice does not have to overcome the effects of surface tension, causing air to be preferentially routed to that portion of the element and thus correspondingly impairing the uniformity of distribution of flow from the element. However, if the supporting means and other associated structure are so shaped and positioned that any exposed portion of the element capable of emitting air to the liquid has ready access to replacement liquid, so that the surface is not swept and kept clear of water, the aforementioned distribution difficulty can be avoided. Alternatively, a portion of the diffusion element which would otherwise discharge air into a crevice of the type described above can be sealed by appropriately positioning a seal of lesser height than the element, by applying an impermeable coating to the surface, or by sufficiently compressing such sides or any portion thereof having access to water so as to render same substantially impermeable. However, the preferred diffusion elements include sides which are porous, at least semipermeable, free of adherent material preventing bubble emission and "vertical" (including near vertical, e.g. within about 20° of vertical). Still more preferably such vertical or near vertical edges are covered by the combined structure of the plenum, sealing means and retaining means. According to a particularly preferred embodiment, described in greater detail below, the sealing means is of lesser height than the diffusion element, but is positioned at an upper edge defined by the intersection of said vertical or near vertical sides and an upward facing portion of the upper gas discharge surface of the element.

The diffusion elements will generally be mounted in a natural or man-made water impound such as a lake, lagoon or tank, most commonly a large tank of concrete construction for activated sludge treatment of domestic sewage. The diffusion elements will be mounted in the water impound in one or more arrays connected to the gas distribution network and may be supported at one or more elevations, assuming suitable pressure or flow controls or separate compressors are provided to insure proper distribution of the aeration gas to the elements at the various levels. Preferably however all elements within a given tank which are in open communication with the same gas distribution network are mounted at substantially the same elevation.

FIGS. 1 through 18 disclose specific embodiments of particularly preferred forms of the apparatus of the present invention. In this connection FIG. 1 shows a sewage aeration tank 1 including a bottom 2 with side and end walls 3 and 4 to contain a body of sewage which is to be aerated. A compressor 5 is provided to feed filtered atmospheric air through valve 6A, flow indicator 7A, and branch conduit 18A to air main 8. Storage tank 19 contains a supply of cleaning gas stored at high pressure which may be discharged to air main 8 in controlled or predetermined admixture with the compressed air via valve 6B, flow indicator 7B and branch conduit 18B. By manipulation of valves 6A and 6B one may commence, terminate or control the flow of aerating and cleaning gas whereby the foregoing elements constitute means for feeding aeration gas and for continuously or intermittently feeding a mixture of aeration gas and cleaning gas to the distribution network.

The distribution network comprises air main 8 which is generally supported above the level of liquid in the tank 1, and which feeds into a downcomer pipe 9, extending vertically from air main 8 to a horizontally disposed distributor pipe 10 supported substantially horizontally a short distance above bottom 2. Parallel rows of air header pipes 11, also supported horizontally a short distance above bottom 2, are fed by distributor pipe 10. The spacing, in a horizontal plane, for air headers 11 and diffusers 12 is determined on the basis of criteria known to persons skilled in the art.

In certain preferred embodiments, air main 8 and downcomer pipe 9 are of metal, while distributor pipe 10 and branch conduit 18B are of synthetic resin; downcomer 9 and pipe 10 are connected at a gas tight pipe coupling (not shown). In one such embodiment, conduit 18B enters but does not communicate with air main 8 at the point of intersection shown in FIG. 1 and extends continuously within air main 8 and downcomer 9 to a discharge outlet in pipe 10 downstream of the coupling and below the surface of the liquid in the tank. Alternately, conduit 18B extends, separately from air main 8, directly to a submerged connection with pipe 10 downstream of the coupling.

FIG. 2 shows in perspective a broken out and enlarged portion of one of the air headers 11 with its diffusers 12.

As shown in FIGS. 3 and 4, header pipe 11 has air outlet openings 13 formed at longitudinally spaced intervals along its top center line to feed air into the respective plenums 14 of diffusers 12. Each plenum 14 includes lower wall means 15. All or at least a substantial portion of the lower wall means is circular in transverse cross section and conforms to the outer surface 16 of pipe 11. Lower wall 15 may be held in close fitting engagement with pipe 11 in a variety of ways, including various mechanical arrangements, such as clamps or straps but preferably by bonding to the pipe. In general any bonding technique may be employed, such as for instance, adhesive bonding; but if the pipe is of polymeric material, which is preferred, the attachment may also be made by solvent or thermal (including sonic) welding. The latter is of considerable advantage in terms of ease and economy of construction. Depending on the type of attachment means employed, the plenum may be sealed to the pipe by the same means used in attaching the plenum to the pipe, or by different means. Thus one may provide an elastomeric seal between the plenum lower wall means and pipe outer surface 16, or the seal may be provided by the welding or adhesive referred to above.

From the standpoint of structural integrity, especially when using both polymeric pipe and a plenum of polymeric material, it is beneficial that lower wall means 15 be held in close fitting engagement with a substantial portion of the length of the pipe outer surface 16 (as shown in FIG. 4) and of the transverse cross section of the pipe. Preferably, lower wall 15 conforms and engages with the transverse cross section of the pipe through an arc of at least about 20°, more preferably about 45 or more degrees and most preferably about 70 or more degrees, at least in the mid portion 17 (FIG. 4) of the lower wall means. In the illustrative and preferred embodiment shown in FIGS. 3 and 4 the arc is about 90°.

As shown in FIGS. 3 and 4, lower wall means 15 includes an air inlet opening 22, around which there may be provided a small upstanding boss 23 (FIG. 3) on the inner surface of plenum lower wall means 15. Air outlet opening 13 and air inlet opening 22 are maintained in registry with one another.

According to the invention, the system is provided with an air flow regulator member, one possible example of which is indicated by reference numeral 24. According to a preferred embodiment a combined bonded assembly is formed by the pipe, by lower wall means 15 and by the air flow regulator member or a sleeve member 25 in which the air flow regulator member is mounted. Thus, for instance, all of these parts may be simultaneously adhesively bonded or welded, with considerable savings in manufacturing steps and costs. The air flow regulator member 24 and various embodiments thereof will be discussed in greater detail below. The lower wall means 15 may be of any desired shape as viewed in horizontal plan view. It may for instance have a square, rectangular, circular or oval outline, the latter being preferred. Air inlet opening 22 and regulator 24 are both preferably within this outline as viewed in plan view.

Figure 5:
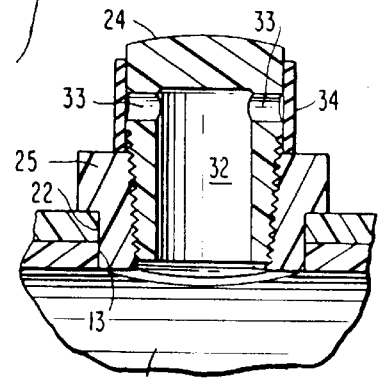
FIG. 5 is an enlarged portion of FIG. 4 showing portions of the wall of the header pipe and the lower wall of the plenum, along with the details of the air flow regulator member which is in communication and connected with the air outlet and inlet openings in said pipe and lower wall. This figure also shows an optional lower valve member on the air flow regulator member.
Figure 6:
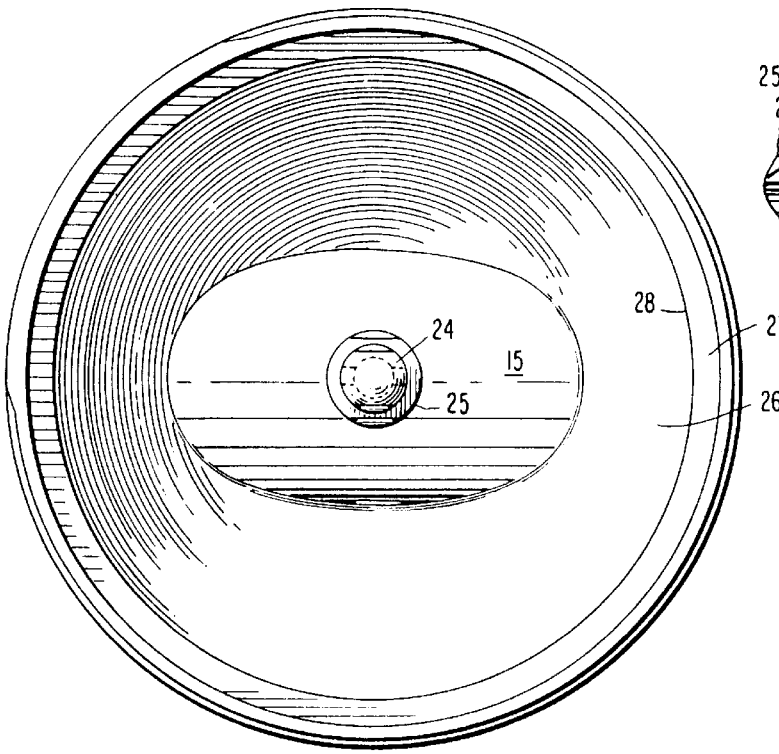
FIG. 6 is a plan view of the plenum of FIG. 4.

FIG. 5 shows the regulator 24 of FIGS. 3 and 4 enlarged and in longitudinal cross section. In this embodiment the regulator is a plug member having a central void to communicate through the open bottom of sleeve 25 with the interior of pipe 11. Extending laterally from recess 32 are a pair of horizontal orifices 33 communicating with the interior of plenum 14. As shown in FIGS. 3 and 4 these orifices 33 are in direct open communication with the interior of plenum 14. However, if the outer ends of orifices 33 are covered by an elastic band 34 as shown in FIG. 5, the orifices have a uni-directional flow characteristic, i.e. they function as check valves. Such characteristic is valuable if there is a temporary loss of air pressure in header pipe 11. The uni-directional flow characteristic of the regulator tends to maintain pressure within plenum 14, thus discouraging backflow of liquid from the exterior of the diffuser through the diffusion element 35 into the plenum. This reduces the difficulties of starting up the system when pressure is restored. Backflow of sewage-laden water through diffusion element 35 or regulator 24 tends to plug these components, leading to possible complete plugging or non-uniform distribution of air flow through the element and/or system when the flow of air under pressure is restored.

Figure 5A:
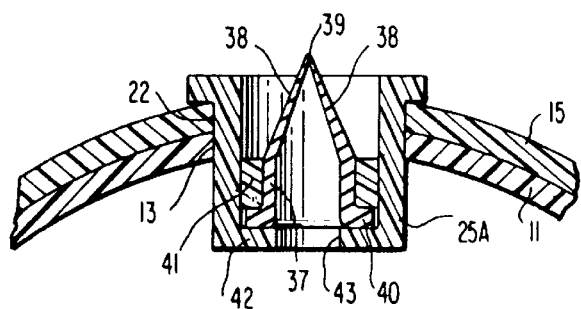
FIGS. 5A–D show the same portions of the header pipe and plenum walls as FIG. 5 with alternate forms of air flow regulator members which may be substituted for those shown in FIGS. 4 and 5.

FIG. 5A discloses a pressure responsive uni-directional flow regulator commonly referred to as a "duckbill". The duckbill is normally made of flexible and elastic material in a lip-like configuration reminiscent of a duck's bill and having lips terminating in a slit which is normally closed. In this embodiment the duckbill is mounted in a sleeve 25A recessed in the plenum lower wall 15 and header pipe 11, so that the duckbill may be mainly within the outline of the header pipe. The duckbill has a cylindrical barrel portion 37, lips 38 terminating in a horizontal slit 39 and an annular flange portion 40 which is confined in sleeve 25A by a concentric collar 41 fixed within sleeve 25A. An inwardly directed flange 42 with central opening 43 at the lower end of sleeve 25A supports the duckbill from beneath and provides communication with the interior of cylindrical barrel 37, by means of which air is communicated from the interior of the pipe between lips 38 and through slit 39 into the interior of plenum 14. The orifice provided upon opening of slit 39 varies in accordance with the pressure, but closes on termination of inward flow relative to the plenum. Thus, like the modification illustrated in FIG. 5, this regulator acts as a check valve.

Figure 5B:
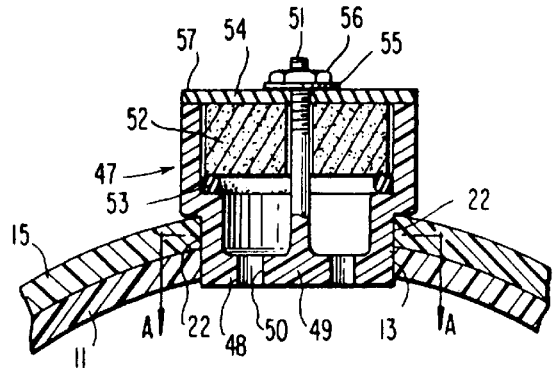
Figure 5D:
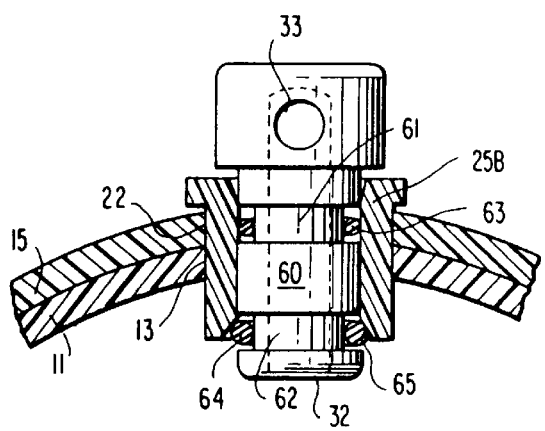
Figure 5C:
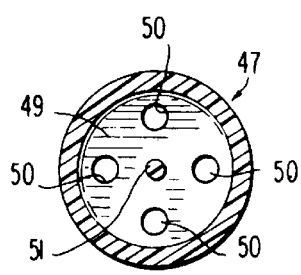

FIGS. 5B and 5C illustrate a flow regulator comprising a plurality of passages having a large ratio of length to cross sectional area. The regulator of FIG. 5B, shown in partial section, includes a stepped cylindrical housing 47 of which lower end 48, having a reduced cross section, closely fits within the air outlet and inlet openings 13 and 22 of header pipe 11 and plenum lower wall 15, which components may if desired be welded into a unitary assembly. Housing 47 includes a circular lower base 49 with air inlet holes 50 more clearly shown in FIG. 5C, and serves as the base for a central threaded post 51 which extends above the top of housing 47. In the upper larger diameter portion of housing 47, is an annular porous plug 52 which substantially fills the space between post 51 and the side walls of housing 47. Bypassing of air flow between the outer periphery of plug 52 and the internal walls of housing 47 is prevented by an O-ring seal 53 adjacent the plug and compressed between the plug and the step in housing 47. Bypassing of air flow through the center hole in plug 52 between the plug and post 51 is prevented by a flexible sealing flap 54 held in sealing engagement with the center portion of the upper surface of the plug by washer 55 and nut 58 threaded on post 51. The flexibility of flap 54 permits its outer edge to rise when air passes from the interior of header pipe 11, through porous plug 52 to its upper surface. Thus air emitted from the upper surface of the porous plug may pass between the upper edge of housing 47 and the flap edge 57 which acts as a uni-directional valve. On termination of upward flow through porous plug 52, or upon the commencement of flow in the opposite direction, the flap closes, preventing reverse flow of gas back towards header pipe 11. Alternatively, the bypassing effects described above can be controlled by impermeable coatings on the walls of the center hole and periphery of plug 52.

Like FIGS. 3, 4 and 5, FIG. 5D illustrates a readily removable and replaceable flow regulator. In this embodiment, the regulator is partly within plenum 14 and partly within pipe 11. A sleeve 25B is positioned in air outlet and inlet holes 13 and 22 of header pipe 11 and plenum lower wall 15. Like the regulator of FIGS. 3, 4 and 5, the regulator in FIG. 5D includes a cylindrical void or recess 32 open at the bottom and, in communication therewith, a horizontal orifice 33. The horizontal barrel portion 60 of this regulator closely fits within the cylindrical bore of sleeve 25B and has two annular grooves, upper and lower grooves 61 and 62 respectively, in which upper and lower O-rings 63 and 64 are mounted. Upper O-ring seal 63 is of slightly larger outer diameter than the inner diameter of sleeve 25B, and effectively seals off flow from header pipe 11 to the interior of plenum 14 through the space between cylindrical barrel 60 and the inner surface of sleeve 25B. Lower O-ring 64 has a somewhat larger external diameter which enables it to act as a catch to hold the flow regulator in place. O-ring 64 is sufficiently compressible and has sufficient space in groove 62 so that cylindrical barrel portion 60, with O-ring 64 in place in groove 62, may be introduced into the upper end of sleeve 25B and forced through sleeve 25B to the position shown in FIG. 5D, at which point O-ring 64 expands against the tapered lower inner surface 65 which forms a detent at the lower end of sleeve 25B. O-ring 64 has sufficient exterior diameter to hold the regulator member in place under normal operating pressure, but the regulator may be withdrawn without destroying the regulator or the sleeve 25B, and may be replaced with a regulator of differing flow characteristics. This is beneficial when it becomes necessary to replace diffusion element 35 (FIGS. 3 and 4) with elements having different head loss characteristics, or in the event it is desired to alter the overall operating characteristics of the aeration system.

The foregoing FIGS. 3, 4, 5, and 5A–5D disclose but a few of the possible alternative forms of regulators which may be mounted within the transverse cross-sectional area of the plenum, of the header pipe or of both of them. However, the various flow regulator devices depicted herein have the common characteristic that each of them is included in a member which terminates beneath the diffusion element 35. Persons skilled in the art will readily furnish a variety of alternative regulator devices, mounted in various fashions, which correspond with the foregoing.

As shown in FIGS. 3 through 5, side wall means 26 is connected with the periphery of lower wall means 15. The side wall may be vertical, or inclined inwardly or outwardly from the lower wall means. Preferably, the side wall means is connected with the entire periphery of the lower wall means, and is inclined upwardly and outwardly from the lower wall means. Diffusion element supporting means, spaced upwardly and outwardly from the lower wall means, are provided on said side wall means. Such supporting means may for instance include a horizontal annular shelf 27 with inner and outer diameters respectively smaller and larger than the diameter of the lower edge of the diffusion element 35, to be described in greater detail below. Shelf 27 may, if desired, be part of a step in side wall means 26, the rising portion of which step comprises a cylindrical generally upright wall 21. The diffusion element supporting means may be in any desired position on sidewall means 26, but is preferably at (in, on or near) the extreme upward and outward projection of wall means 26. Preferably also wall means 26 is of a conical shape.

According to one of the preferred alternative forms of the invention, disclosed in FIGS. 3–4, the plenum includes an integral generally upstanding wall 28 which, when viewed in plan view, surrounds the diffusion element supporting means, e.g. annular horizontal shelf 27. When provided, which is preferred, upstanding wall 28 has a height which is about equal to the height of the diffusion element 35. Thus, according to this preferred alternative, the height of wall 28 may be equal to or slightly greater or less than the height of the diffusion element. Wall 28 has an inner surface 29, also generally upstanding, an upper edge 30 and threaded outer surface 31. The shelf 27 and generally upstanding wall 28 therefore can, in the preferred embodiment, provide a socket to receive diffusion element 35, in which substantially the entire height of diffusion element 35 is recessed as shown in FIG. 3 and in the enlargement in FIG. 7.

The most preferred diffusion element is a ceramic plate of circular outline having a stepped edge, depicted in FIGS. 3 and 4, and includes circular central flat area 70, annular beveled edge 71, annular flat surface 72, outer annular beveled surface 73 and horizontal annular surface 74, whose respective outer diameters are 4.5, 6.5, 7.6, 8.7 and 9.25 inches respectively. Surface 70 lies 0.070 inch below surface 72. Beveled surface 73 is at an angle of inclination of 25° relative to the horizontal. The respective overall heights of horizontal annular surface 74, the top edge of vertical side surface 75 and horizontal flat surface 72 are 0.5, 0.7 and 1.0 inch respectively.

The plate is formed from a mix containing particles of alumina with mean transverse and longitudinal dimensions of 0.020 and 0.032 inch respectively, and 20 parts by weight of ceramic bonding agent, per hundred parts by weight of alumina particles. The mix is compacted in a press having a ram with a planar surface and a cylindrical die cavity having a bottom wall with a shape corresponding to the upper surface of diffusion element 35.

The sides of the die cavity and the ram correspond in diameter with the peripheral edge 76 of diffusion element 35 the height of the die cavity from its bottom surface to its upper edge being 1.5 inches. The mix is poured into the cavity in excess, is struck off level with the top of the die and is compressed to the dimensions previously given under a pressure of approximately 900 psi. The resultant compact, after removal from the press, is fired in a kiln at a temperature sufficient to fuse the bonding agent and is then gradually cooled. The resultant product is a coherent porous ceramic diffusion element having a specific permeability of 25 SCFM +/−3 SCFM.

The diffusion element, whether of the above-described preferred type or not, is supported by and preferably nests within the plenum on the diffusion element supporting means. A sealing means is provided adjacent the periphery of the diffusion element for preventing leakage of air past the periphery of the element.

In the preferred embodiment disclosed in FIGS. 3, 4 and 7 herein, a polyisoprene O-ring 80, having a Shore A Durometer hardness of about 40 +/−3, nests in an annular step formed about the upper portion of the peripheral surface of diffusion element 35. The diameter of the cross section of O-ring 80 preferably slightly exceeds both the spacing between inner surface 29 of plenum side wall means 26 and opposed, facing vertical or near vertical side 75 of element 35, and the height of the vertical or near vertical surface of side 75.

The preferred retaining means of the present invention shown in FIGS. 3, 4 and 7 is an internally threaded clamping ring 84 including a cylindrical member 85 having internal threads 88 matching external threads 31 on side wall means 28 of the plenum. Cylindrical member 85 has attached to it above the threads 86 a flange 88 which extends inwardly over generally upstanding wall 28 of the plenum and at least partly across the top of sealing means 80. According to a preferred embodiment the said flange 88 leaves the upper inner quadrant of the cross section of the O-ring 80 uncovered (shown in greater detail in FIG. 7) while clamping the O-ring with sufficient force to press it in tight engagement with at least the uppermost portion of vertical side portion 75 closely adjacent the edge 89 between side 75 and the upwardly facing adjacent surface 73, thereby avoiding formation of a crevice at the side of the diffusion element which would be in communication with the overlying water and could evacuate itself.

FIGS. 8 through 14 show alternative but less preferred embodiments of the combination of plenum, diffusion element, sealing means and retaining means which may nevertheless be used successfully in the invention. Each of these various embodiments has in common a plenum side wall means 26, annular horizontal shelf 27, and generally upstanding wall means 28 which is about of equal height with the diffusion element and which faces the opposed peripheral surface or surfaces of the diffusion element which is indicated by reference numerals 35 and 35A through 35G. For example, in FIG. 8, generally upstanding wall means 28 is provided with peripheral flange 90 and circumferentially spaced bolt holes 91 through which extend bolts 93 to clamp a plurality of circumferentially spaced clips 92 against the respective upper surfaces of flange 90 and diffusion element 35A. An elastomeric band or hoop member 95 serves as sealing means. For example, the hoop or band may have an unstretched inside diameter of about 85% of the outside diameter of diffusion element 35A, and is of slightly greater width that the vertical thickness of the diffusion element. When stretched and placed around diffusion element 35A, the extra width of the band forms an inturned upper edge 97, an inturned lower edge 98 and a cylindrical center portion 96, which respectively enclose the upper and lower edges 99 and 100 of the element. Inturned lower edge 98, bearing against annular horizontal shelf 27, seals the interior of the plenum from the vertical space between upstanding wall 28 and element 35A. Cylindrical portion 96 of the elastomeric band prevents air from passing peripherally out of diffusion element 35A into the crevice between itself and upstanding wall means 28. This is an example of retaining means which engages only the element and not the sealing means, and does not contact the entire periphery of the element.

The embodiment of FIG. 9 includes in its generally upstanding wall means 28 a second horizontal shelf 105 and, at the upper edge of said wall means, an outwardly extending generally horizontal flange 106. The peripheral edge of diffusion element 35B is provided with an impermeable coating 107 throughout the height of its peripheral surface, bears laterally against O-ring sealing means 80 which rests on shelf 105, and has an interference fit between diffusion element 35B and wall means 28. O-ring 80 is retained in place, i.e. prevented from upward movement, by a retaining ring 108 of cylindrical configuration having an inner surface 109 about which are situated a plurality of circumferentially spaced inwardly projecting lugs 110 which bear down at widely spaced points, with limited inward projection, on the upper surface of element 35B. Retaining ring 108 also includes an integral outwardly extending annular flange member 111 which rests upon and generally coincides with the outwardly extending flange 106 connected with wall means 28. These two flanges are held together by a split ring clamp 116 of generally C-shaped cross section having in transverse cross section limbs 112, 113 with curved inner faces which engage similarly shaped annular detents 114, 115 in the respective lower and upper surfaces of the flanges. The vertical flexibility of limbs 112, 113 and a radial split (not shown) in split ring clamp 116 enable the latter to act as a snap action clamp to hold flange 111 and its integral retaining ring 106 firmly together, while lugs 110 secure the diffusion element 35B in place and the lower surface of ring 108 does not clamp, but does prevent upward movement of O-ring 80.

The embodiment of FIG. 10 is similar in many respects to that shown in FIG. 9. The side of diffusion element 35C has an impermeable coating 107 and faces generally upstanding wall means 28. The latter, as in the previous embodiment, includes a second annular horizontal shelf 105 upon which rests O-ring 80, the latter being held in place by a retaining ring 108 with inner surface 109 and lugs 110. However, instead of the flange 106 previously described, upstanding wall 28 has an integral catch 120 formed about the entire periphery of its outer surface 121, and retaining ring 108 has a plurality of circumferentially spaced outwardly, downwardly and inwardly extending hooks 122 for engaging the catch 120, whereby ring 108 is held in place preventing upward movement of O-ring 80 and holding diffusion element 35C securely in place with lugs 110.

In FIG. 11, annular horizontal shelf 27 includes an inner upstanding lip 27A which helps retain in place a sealing means 125 of substantially rectangular cross section, upon which rests the marginal edge of the lower surface of diffusion element 35D. The side 127 or periphery of element 35D is in opposed, facing relationship with generally upstanding wall means 28 across a narrow vertical space or crevice 131. However side 127 is sealed off from crevice 131 by a substantially impermeable layer including an annular portion 126 above sealing means 125 and a peripheral edge portion 128 on the side of the element adjacent crevice 131. Element 35D is held firmly in place against sealing means 125 by internally threaded clamping ring 129 engaging threads 130 on the outer surface of wall means 28.

FIG. 12, like FIG. 7, is an example of a sealing means located at the edge between a side surface and an upwardly facing upper surface of the diffusion element. As shown in FIG. 12, diffusion element 35E rests directly upon annular horizontal shelf 27 and has a substantially impermeable peripheral edge coating 128, which seals off the side of the element from the crevice 131 formed between the element and generally upstanding wall means 28. In this embodiment the sealing means 133 is of hybrid cross section, having a semicircular outline in its upper portion and a rectangular outline in its lower portion. The semi-circular portion of sealing means 133 is engaged by the form fitting lower surface of annular flange 134 on internally threaded clamping ring 135, the latter engaging threads 136 formed on the outer surface of wall means 28. A short dependent lip 137 on the innermost edge of flange 134 tends to urge sealing means 133 outwardly and downwardly, so that the sealing means flat outer surface 139 and flat bottom surface 138 bear outwardly against the inner surface of wall means 28 and downwardly on diffusion element upper surface 140, and especially on the edge 141 at which upwardly facing surface 140 intersects with the element side surface 142.

FIGS. 7 and 12 both show the sealing means as a member of substantially lesser height than the height of the diffusion element which member is located at an edge at the intersection between the side of the diffusion element and an upwardly facing gas discharge surface thereof. The two embodiments show the sealing means below and adjacent said edge, or above and adjacent said edges. However, it is also possible to provide sealing means which covers a portion of the element both above and below the said edge. These various preferred configurations minimize the above described difficulties which occur with crevices that can be swept free of water and relieve adjacent portions of the element from the influence of surface tension, resulting in disturbance of the uniformity of distribution of air by the element. A particularly beneficial result is obtained when a sealing means at such an edge is used in combination with means for reducing the permeability of the side of the element, such as for instance, the band member 95 of FIG. 8 and the impermeable coatings 107 and 128 of FIGS. 9–12, or the stepped side configuration shown in FIG. 7. In the stepped configuration the particulate material of the diffusion element beneath horizontal annular surface 74 and adjacent peripheral surface 76 has been subjected to sufficient compression to reduce its permeability as compared to the upwardly facing gas discharge surfaces 72 and 73. The peripheral surface 76 may have merely a reduced permeability relative to the upwardly facing gas discharge surfaces, or may be rendered substantially impermeable. The property of reduced permeability relative to the upwardly facing gas discharge surfaces (including substantial nonpermeability), is beneficial when combined with the sealing means at the above described edge. The combination tends to reduce both the crevice difficulties described above and difficulties with short circuiting of air from the plenum to the element gas discharge surface along air flow paths of differing length. For this reason, the combination of a side of reduced permeability and a sealing means at the above described edge represent a preferred embodiment of the present invention.

In FIG. 13, as in the preceding figure, the diffusion element 35F rests directly upon annular horizontal shelf 27. In this embodiment element 35F includes an annular recess 143 at the upper edge of its side 144. Side 144 as well as the lower and upper portions 145 and 146 of recess 143 are covered with a non-adherent cover or an impermeable coating 147. O-ring sealing means 80 rests in recess 143 and has an interference fit with impermeable coating 147 and the inner surface of wall means 28, while engaging the curved transitional surface 148 between the lower and upper surfaces 145 and 146. The O-ring seal 80 is clamped tightly in place by internally threaded sealing ring 149 engaging threads 150 in wall means 28, and consequently retains diffusion element 35F in place.

In the embodiment of FIG. 14 the side of diffusion element 35G includes a step generally indicated by 151 and including a generally horizontal annular surface 152 and vertical cylindrical surface 153, both of which are covered with a non-adherent cover or coated with impermeable coating 154. The remainder of the side of element 35G is a lower cylindrical surface 155 which need not necessarily have any impermeable coating thereon. O-ring seal 80 is compressed against four surfaces, including diffusion element surfaces 152 and 155, horizontal annular shelf 27 and the inner surface of wall means 28. Thus, inverted step 151 rests upon the O-ring 80 and is thereby indirectly supported by the diffusion element supporting means. An internally threaded clamping ring 156 engaging threads 157 on wall means 28 clamps the diffusion element in place. The annular flange 158 of clamping ring 156 has an inner surface 159 of about the same diameter as the diffusion element side surface 153. Lugs 160, situated at spaced points around the ring inner surface 159, extend a short distance inwardly over the upper surface of element 35G, holding it in place. Thus, the diffusion element 35G is clamped only at its periphery, and only at spaced positions along the periphery.

Figure 15:
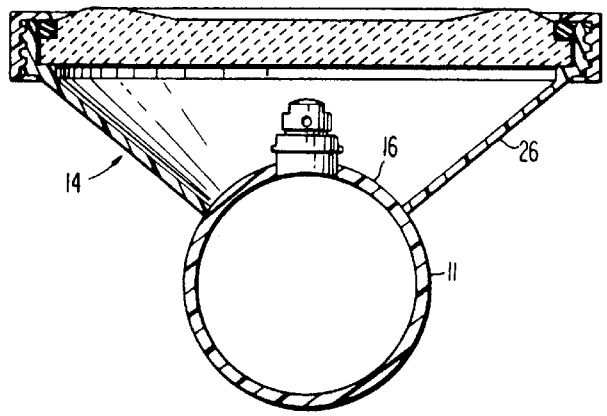
FIG. 15 is a vertical transverse cross section of the header pipe and one of the diffusers of FIG. 2 wherein the plenum side walls are affixed directly to the pipe wall, whereby the upper surface of the header pipe serves as the bottom wall of the plenum.

As shown in FIG. 15 side wall means 26 are affixed directly to the surface 16 of header pipe 11 so that surface 16 forms the lower wall of plenum 14.

Figure 16:
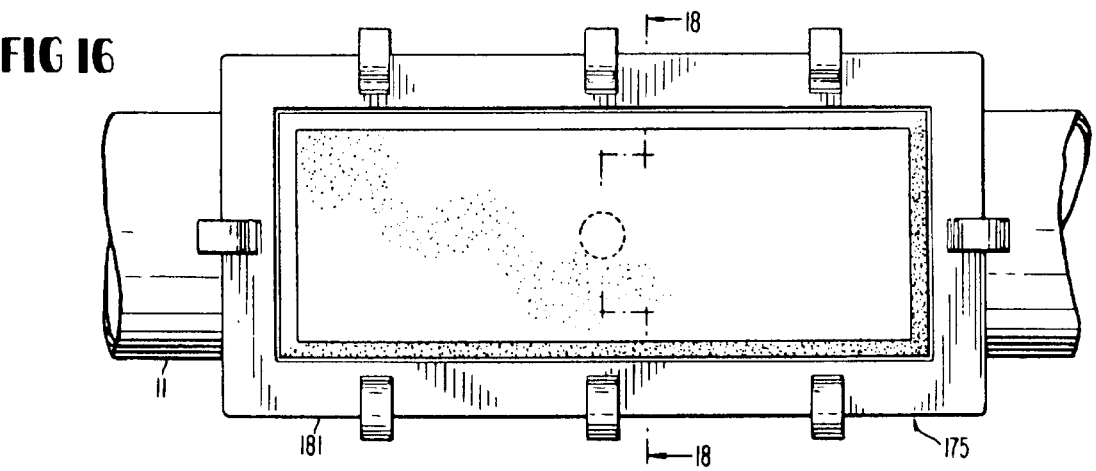
FIGS. 16 and 17 are plan and elevation views of a header pipe and diffuser wherein the diffuser has vertical side walls.
Figure 17:
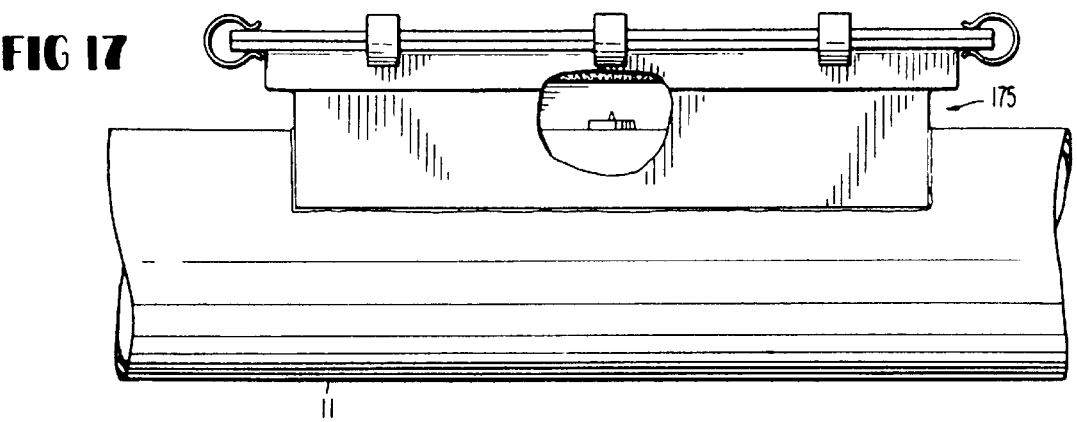
Figure 18:
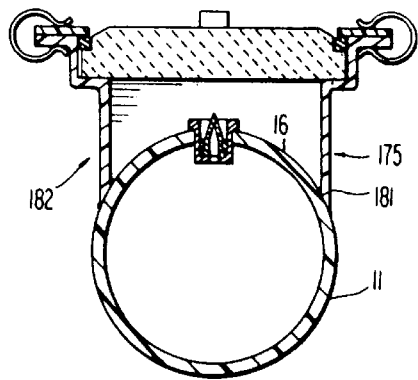
FIG. 18 is a vertical transverse cross section of the header pipe and diffuser of FIG. 16 taken at section 18—18 of FIG. 16 showing a structure wherein the upper surface of the header pipe serves as the bottom wall of the plenum.

In the embodiment of FIGS. 16, 17 and 18, diffuser 175 is shown with vertical walls 181. FIG. 18 shows the vertical side walls bonded directly to surface 16 of header pipe 11 whereby surface 16 forms the lower walls of plenum 182. Although shown as rectangular, the walls could be curvilinear, including circular and elliptical, or irregular.

Figure 19:
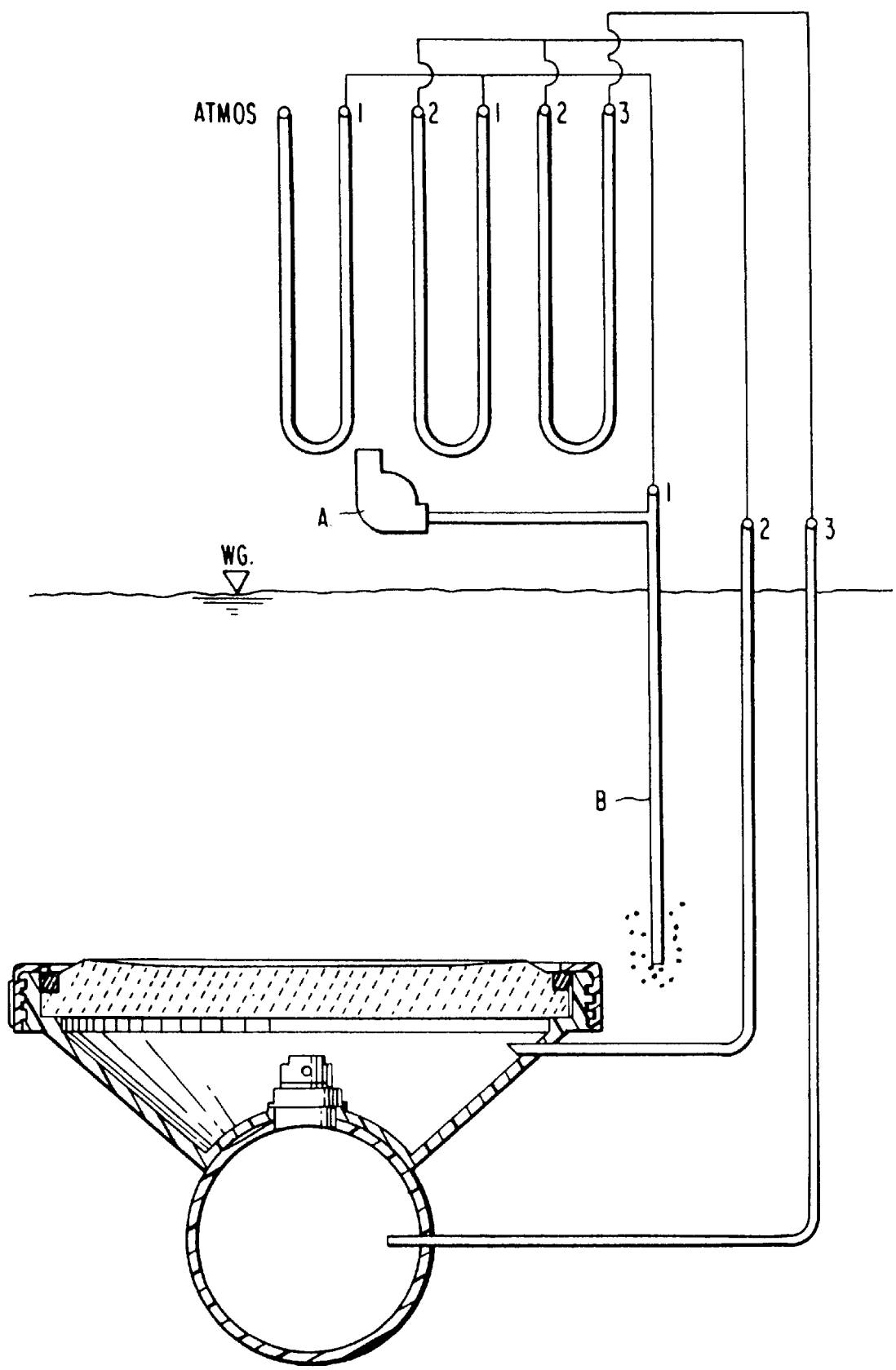
FIG. 19 is a sectional view, partly schematic, showing a portion of a gas distribution network, flow regulating means, a diffusion element and its holder, and means for determining pressure and flow data useful in the practice of the invention.

FIG. 19 discloses a preferred apparatus for obtaining dynamic wet pressure at any point in time under a variety of operating conditions, and can provide a basis of comparison at other conditions. The figure is a vertical transverse cross-section of a header pipe through an air flow regulator and its associated plenum and diffusion element, showing the location of pressure taps, a bubble pipe and ancillary equipment required to obtain the pressure(s) in question. The pressure taps and a series of lines feeding manometers or other suitable pressure measuring devices are used to determine the various desired pressure readings. An air supply A, which can be a separate compressor or a tap into the plant aeration air system is used to supply a slow rate of air through a bubble pipe B, having its lower, open end located at the same elevation as the discharge surface of the diffusion elements. The pressure detected in line 1 will indicate the hydrostatic head applied to the diffusion element. This pressure is read from the manometer connected between line 1 and the atmosphere. Dynamic wet pressure is read from the manometer connected to lines 1 and 2. Assuming the use of flow regulators having gas orifices or apertures of known pressure/flow characteristics, and the availability of the barometric pressure and other information needed for making the requisite calculations, the flow rate through the element can be calculated based on the pressure read from the manometer serving lines 2 and 3. Temperature measuring means, for example thermometers or transducers, may be provided at any convenient submerged or non-submerged location within or without the gas distribution network for obtaining temperature data which is sufficiently related to or representative of the temperature of the gas flowing through the above-mentioned flow regulator for calculating flow with the requisite precision. Preferably, the temperature measuring means is situated adjacent to, including just upstream of, the flow regulator of that diffusion element which is used to take the pressure readings, or as close thereto as practicable.

Figure 20:
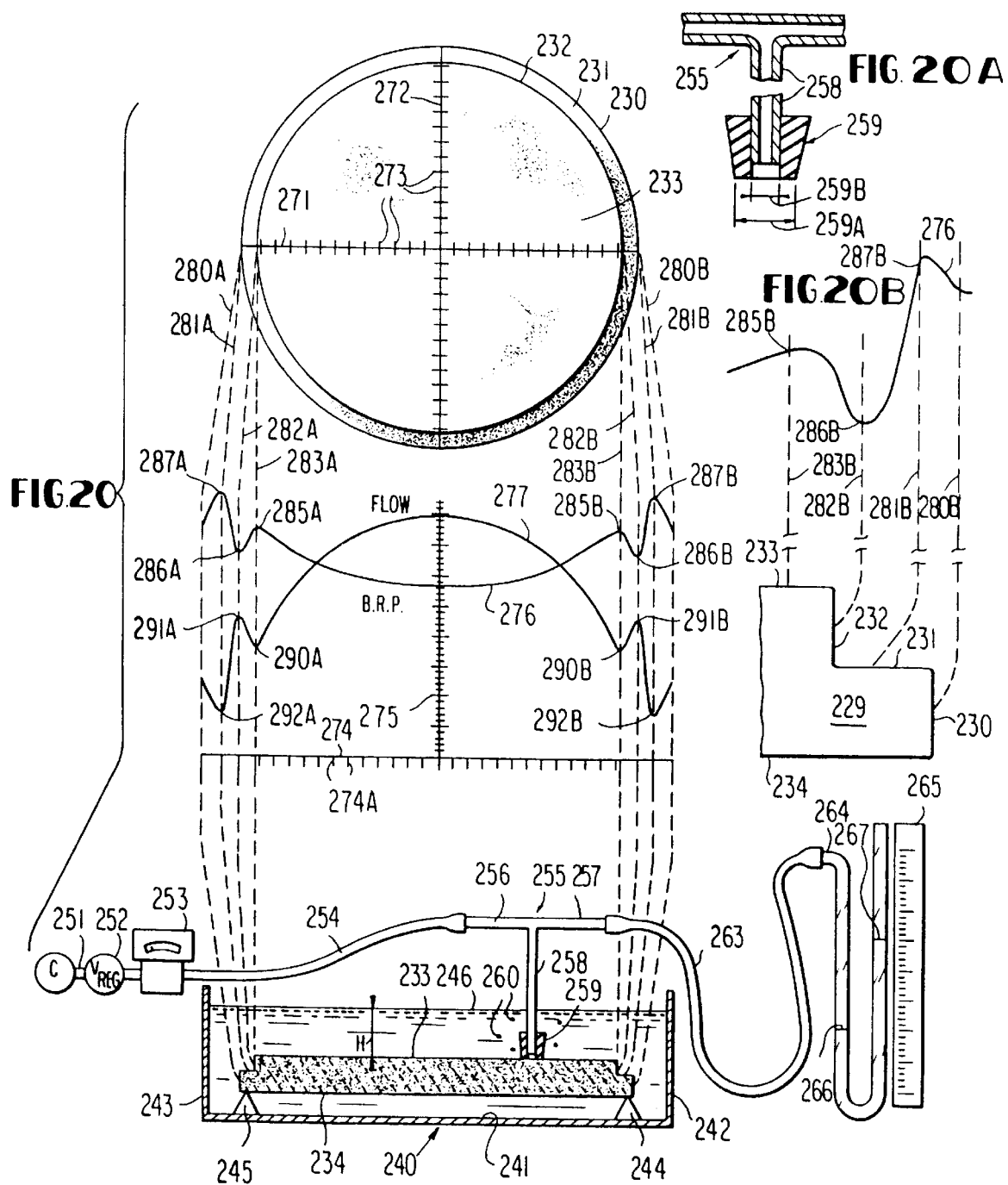
FIG. 20 is a diagrammatic illustration, partly in section, including a gas diffusion element, an apparatus for determining the bubble release pressure of the element and a graphical representation of the bubble release pressure and corresponding flow characteristics of the element.

FIGS. 20, 20A and 20B illustrate the determination of bubble release pressure. FIG. 20 depicts a diffusion element in plan view at the top of the figure and in vertical cross-section at the bottom of the figure. This element includes an integral annular peripheral zone generally indicated by reference numeral 229 (FIG. 20B), vertical cylindrical edge 230, horizontal annular surface 231 and vertical side surface 232, as well as gas infusion surface 234 and discharge surface 233. However, it should be noted that surface 233 can also serve as the gas infusion surface, in which case surface 234 would become the gas discharge surface. FIG. 20 illustrates the testing of this plate for bubble release pressure. One possible apparatus for performing such a test is shown in the lower portion of FIG. 20 and in FIG. 20A.

The exemplary apparatus includes a tank 240 (FIG. 20) having bottom wall 241 and side walls 242,243. Resting on bottom wall 241 are supports 244,245 which support the diffusion element with its gas discharge surface 233 facing upwardly beneath the water level 246. Compressor C is connected via conduit 251, pressure regulating valve 252 and flowmeter 253 with a first hose 254. The latter is in turn connected to the first horizontal leg 256 of a tee 255 having a second horizontal leg 257 and vertical leg 258. A sealing ring 259 is provided around the open bottom end of vertical leg 258. Second horizontal leg 257 is connected via second hose 263 with a manometer 268 having a scale 265. By comparison of liquid levels 266 and 267 with scale 265 it is possible to determine the pressure within the system, which is assembled carefully to provide gas tight joints at all connections between components.

As shown in greater detail in FIG. 20A, the vertical leg 258 of tee 255 and the sealing ring 259 constitute a test probe. It may for example be fabricated from a standard laboratory glass tee having a sufficient internal diameter to readily deliver the desired gas flow and from a standard rubber stopper assembled as shown, the bottom of the stopper constituting the end of the probe and having outside and inside diameters 259A and 259B of $\frac{3}{8}$ inch and $\frac{3}{16}$ inch, respectively. The probe, when manually pressed against the gas discharge surface 233 of the diffusion element, is circumscribed by the site to be tested. The lower surface of sealing ring or stopper 259 forms a gas-tight seal with surface 233, which forces air to pass through the element below and adjacent to seal 259 and to exit into the liquid in the test site area as bubbles 260. The pressure required to release the bubbles can be read from the manometer. Since the stopper 259 is non-adherent relative to surface 233, the probe may be readily moved from one test site to another to take a series of pressure readings from which bubble release pressure can be calculated.

Returning to FIG. 20, mutually perpendicular reference lines 271 and 272 are drawn on gas discharge surface 233 of the diffusion element. Equally spaced reference marks 273 situated along reference lines 271 and 272 identify probe positions over which the open end of the above-described probe of FIG. 20A is sequentially positioned in such a way as to produce an effective seal as described above. Regulating valve 252 is adjusted against a relatively high pressure from compressor C to a relatively low rate of flow, i.e. $2 \times 10^{-3}$ C.F.M. When a bubble or bubbles 260 are produced through a portion of the gas discharge surface adjacent the probe, the pressure in the system is read from manometer scale 265. The bubble release pressure at the test point is obtained by subtracting the hydrostatic head H, between gas discharge surface 233 and water level 246, from the pressure read from the manometer. Taking bubble release pressure measurements at a statistically significant number of randomly or uniformly established points on gas discharge surface 233 enables one to determine the bubble release pressure of said surface. However, in actual practice it has been found to be reasonably accurate and convenient to establish all of the pressure testing points along two mutually perpendicular reference lines as shown. In a diffusion element manufactured with reasonable care, conducting the tests along two such reference lines provides a reasonably accurate approximation of the uniformity of distribution of air flow capabilities across the gas discharge surface.

The central portion of FIG. 20 includes a graph having a horizontal coordinate 274 with divisions 274A corresponding in scale and position to reference marks 273 on reference line 271. Vertical coordinate 275 of this graph includes an appropriate scale of pressure values whereby the pressure readings taken at reference marks 273 on reference line 271 may be plotted between the coordinates to develop a bubble release pressure profile or curve 276. In a tank 240 with sufficient space between side walls 242,243 and the sides of the diffusion element, it is possible also to take bubble release pressure readings at the vertical cylindrical edge 230, horizontal annular surface 231 and vertical side surface 232 as well as at a point on gas discharge surface 233 which is quite close to the vertical side surface 232. The positions of the test sites on the diffusion element and the corresponding positions of the pressures as plotted in the graph are shown by dashed reference lines 280A,280B (vertical cylindrical edge 230), 281A,281B, (horizontal annular surface 231), 282A,282B (vertical side surface 232) and 283A,283B (edge of gas discharge surface 233). The aforementioned testing and plotting positions are shown in greater detail in FIG. 20B, an enlarged and foreshortened portion of FIG. 20.

The bubble release pressure is an indication of the pressure required for bubbles of air to overcome surface tension upon discharge from the pores of the plate. It has been found that this pressure requirement can considerably exceed the pressure losses due to friction in pushing the gas from the air infusion surface to the gas discharge surface of the plate. This is particularly true where the plate is fabricated of hydrophilic materials which are readily wetted by the water as compared to hydrophobic materials.

The graph in FIG. 20 shows that the diffusion element exhibits minimum bubble release pressure (B.R.P.) in a central region of the element. In surrounding regions of the element, the bubble release pressure grows gradually higher, climbing towards a maximum 285A,285B, indicated by reference lines 283A,283B, based on tests made on gas discharge surface 233 adjacent vertical side surface 232. Bubble release pressure tests on side surface 232 indicated by reference lines 282A,282B indicate that the bubble release pressure reaches a second minimum 286A,286B in this area. A further measurement of bubble release pressure on horizontal annular surface 231, indicated by dashed lines 281A,281B shows that the pressure can reach a second maximum 287A,287B in this area. A final observation taken on vertical cylindrical edge 230 as indicated by reference lines 280A,280B indicates there can be some reduction of bubble release pressure in this area as compared to the second maximum 287A,287B. The existence of a low bubble release pressure region in vertical side surface 232 as indicated by the second minimum 286A,286B of bubble release pressure curve 276 is unexpected. Using data accumulated along reference line 272, it is also possible to develop a bubble release pressure curve (not shown) for the test sites along reference line 272.

Inasmuch as the rate of flow of gas through a given region of the diffusion element will be an inverse function of the bubble release pressure in said region, it is possible to develop a flow curve 277 which is considered representative of the flow profile of the plate across reference line 271. Actual flow data may be obtained for the central portion of the element by operating the element for timed intervals with an inverted graduated cylinder over the test sites. Estimated flows based on bubble release pressure may be derived for the edges of the element. Analysis of the resulting flow curve provides a practical indication of the uniformity of gas flow distribution across the element. As shown by gas flow curve 277, peak flow occurs in the central region of the diffusion element, tapering off to a first minimum 290A,290B (corresponding to bubble release pressure maximum 285A,285B) near the outer edge of gas discharge surface 233. There are also flow peaks 291A,291B and second minima 292A,292B corresponding inversely and respectively to bubble release pressure minima 286A,286B and second maxima 287A,287B. Thus the testing technique illustrated in FIG. 20 has provided a much clearer and more quantitatively accurate indication of the flow profile of the diffusion element than has heretofore generally been available in the industry. Moreover it has made it possible to see that such diffusion elements may exhibit higher flow rates per unit area in certain regions, while other regions of the elements are underused. Excessive gas flow through one or more regions of the elements tends to produce excessively large bubbles, thereby impairing the oxygen transfer efficiency of the elements.

FIGS. 21 through 31 disclose various forms of diffusion elements configured in such a manner as to avoid the above-described difficulties. In general, these are rigid, monolithic, porous, gas diffusion elements having an enhanced apparent volumetric compression ratio in permeable central and/or boundary portions thereof. The elements are formed of a body of solid particles which has been shaped, pressed and rendered coherent by bonding or sintering in a compacted form having pores. As viewed in vertical cross section the element includes a generally horizontal portion having a specific permeability in the range of about 6 to about 200 SCFM at 2 inches of water gauge. The maximum horizontal dimension of the aforesaid portion is in a ratio of at least about 4 to 1 relative to the thickness of said portion. The said portion also includes an upper gas discharge surface, which is generally horizontal and which has a bubble release pressure in water in the range of about 2 to about 20 inches of water. The central and boundary zones are beneath a portion of the upper gas discharge surface. Within one or both of these zones the solid particles have been pressed to a greater apparent volumetric compression ratio as compared to the material in an adjacent portion of the element, for example in an outward zone positioned between the central and boundary zones beneath the gas discharge surface. The diffusion element may also include a peripheral zone in which the element has a lesser permeability, a greater density or a lesser height than a portion of the element surrounded by the above-mentioned boundary zone or of the gas discharge surface above said portion.

Among the elements referred to above are those in which the apparent volumetric compression ratio of a central zone has been enhanced by distributing the particles in the aforementioned body, prior to or during pressing, for providing a larger mass of particles per unit horizontal area in the central zone, as compared to the mass of particles per unit area in an outward zone. The particles may be distributed prior to or during pressing by providing a larger mass of particles per unit volume in the central zone. Moreover the larger mass per unit area of particles may be provided by performing the pressing in a die having a cavity and filling a central portion and a surrounding portion of the cavity with said particles in respectively greater and lesser depths.

In those elements having central and outward zones, the enhanced apparent volumetric compression ratio may also be provided by effecting, during pressing, relatively larger and smaller ratios of thickness reduction in the central and outward zones respectively; and this is true whether the height of particles in that portion of the body of particles corresponding to the central zone, prior to or during pressing is substantially the same or different, e.g. greater, than the height of the particles in that portion of the body corresponding to the outward zone. These larger and smaller percentages of thickness reduction can be effected by performing the pressing in a press having a ram and die cavity, with spaced, opposed compression faces having respectively smaller and larger clearances in central and surrounding portions of the space between the faces, whether the smaller clearances are provided by a protuberance on the compression face of the die cavity or by other means.

Within the boundary zones of those elements which have boundary zones the greater apparent volumetric compression ratio may be provided in a variety of ways, including effecting, during pressing, relatively larger and smaller ratios of thickness reduction respectively in the boundary zone and in a further portion of the element surrounded by the boundary zone, such as the above mentioned outward zone. Here again, a press having a ram and die cavity with spaced, opposed compression faces with relatively smaller and larger clearances corresponding to the positions of the boundary zone and the aforementioned further portion may be used. The respectively smaller and larger clearances may be provided by protuberances on the compression face of the die cavity, on the compression face of the ram or by other means.

The above-described elements may be embodied in a wide variety of forms including for example those having planar surfaces and those having a depression above or below the central zone and spaced inwardly from the periphery of the element. That is, the element may be provided with a central depression or depressions in its gas infusion surface, its gas discharge surface or both. However, the aforesaid depression(s) may or may not be coextensive with the central zone. The depth and area of the depression(s) may be varied as desired for enhancing the uniformity of gas distribution laterally across the horizontal gas discharge portion of the element, and the depth may vary in portions of, or throughout, the depression(s). There may be one or more areas within the outline of the depression(s) which are not depressed. Moreover the enhanced apparent volumetric compression ratio of the boundary zone discussed above, may be provided by forming the upper gas discharge surface of the element above the boundary zone with a downward and outward slope at an angle of depression in the range of about 10 to about 80° relative to the horizontal.

The above features are of assistance in providing gas diffusion elements having the property of discharging gas in a substantially uniform manner throughout an upper gas discharge surface of the element with a coefficient of variation not greater than about 0.25, said coefficient of variation being based on the values of bubble release pressure measurements at at least about 5 equally spaced points along each of two mutually perpendicular reference lines extending across said surface and through the center thereof.

The above-described elements may be manufactured according to any convenient method. However, FIGS. 21 through 29 disclose illustrative methods which may be used if desired.

These illustrative methods are modification of a previously used method. In common with the prior method they employ a die 301 having a cylindrical cavity 302 defined in part by a compression face or bottom wall 303 and side walls 304 and 305. The die is filled with a loose mix of solid organic or inorganic particles with or without binder which can be pressed and rendered coherent. For instance, one may employ beads or granules of synthetic resin, such as polyethylene or polystyrene, glass beads, granules of inorganic materials such as metal particles, alumina, mullite, silica and others. Organic and inorganic binders may also be included in the mix. The mixes may be designed for developing coherency by pressing and sintering and/or bonding, such as for instance organic adhesive bonding, glass bonding, or ceramic bonding.

In common with the known technique the die 301 is filled above its upper surface 306 with a body of loose particulate solid material 310. Then, the excess material is struck off with a screed. Next, a ram 317 having compression face 318 is moved toward the particulate material and eventually engages same. Further travel of ram 317 presses the body 310 in die cavity 302, converting the body of particulate material to various compacted forms. Withdrawal of ram 317 permits one to remove the resultant compacts from die cavity 302. Depending on the mix used, the compact may or may not be baked or fired to produce the completed element.

Figure 21:
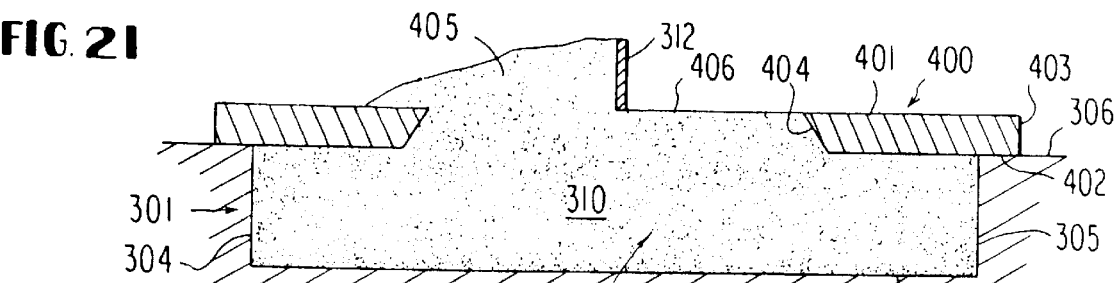
Figure 22:
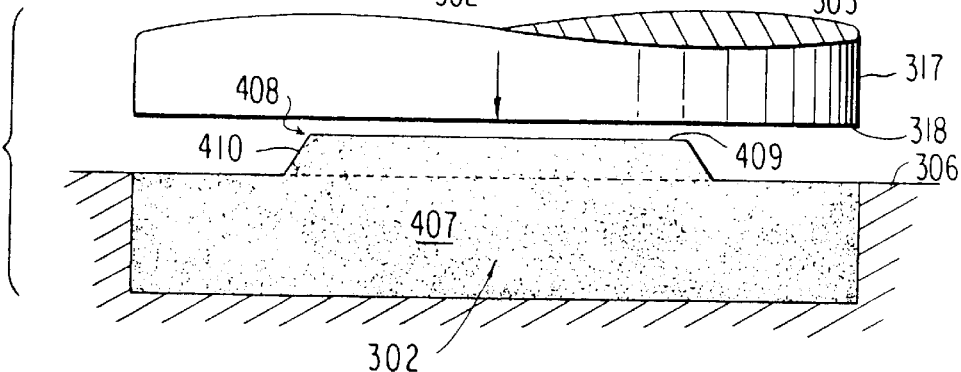
Figure 23:
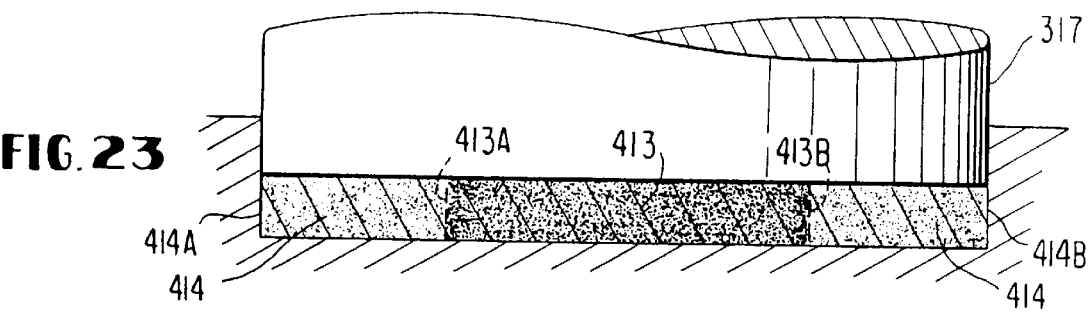

A first example of the modified method, shown in FIGS. 21 through 23, begins with the shaping ring 400 removed, so that the die cavity 302 is open. Particulate materials are introduced in sufficient amount to fill cavity 302 and are leveled off at the elevation of die upper surface 306. Onto said surface is placed a shaping ring 400 having planar upper and lower surfaces 401 and 402 and perpendicular peripheral surface 403 representing its outer edge. The ring also has an internal conical surface 404 defining a central frustroconical chamber open at the top and bottom. The aforesaid chamber is initially empty because the body of particulate material has previously been screeded off flush to the die upper surface 306. However the chamber within internal conical surface 404 is now filled with excess particulate material 405 which is then struck off with screed 312 to a level surface 406 flush with upper surface 401 of shaping ring 400. Upon careful removal of shaping ring 400, there is left in die cavity 302 a body 407 of particulate material having an elevated central portion 408 with a flat top 409 and conical sides 410; however portion 408 can have various shapes.

Body 407 and the above described technique of preparing same constitute one example of providing a larger mass of particles per unit of horizontal area in a central zone or region, as compared to the mass of particles per unit area in an outward surrounding zone or region. In this case, the larger mass of particles per unit of horizontal area is provided by filling a portion of the die to a greater depth than the surrounding portions.

However, a larger mass of particles per unit area can also be provided by filling a central portion of the die with particles at a greater density. For instance, one may fill the die cavity, level the contents flush with the top of the cavity and then densify the particles in a central region of the die by localized vibration or pressing, which will cause the material in such region to sink lower in the die than the surrounding material. The resulting depression can be filled with additional particulate material prior to pressing or final pressing as the case may be. This is an illustration of distributing the particles prior to or during pressing for providing a larger mass of particles per unit volume in a central region or zone as compared to the mass of particles per unit volume in an outward or surrounding region or zone.

Irrespective of whether the central region or zone of the die is filled to a greater height and/or greater density the body of material is then pressed as shown in FIG. 23. This produces an element having an enhanced apparent volumetric compression ratio in its central zone 413 (bounded by reference lines 413A,413B) as compared to the volumetric compression ratio in an outward zone 414, which in this case is an annular zone bounded at its inner edges by reference lines 413A,413B and by the peripheral edges of the element indicated by 414A,414B.

FIGS. 24 through 29 illustrate the preferred technique of providing enhanced apparent volumetric compression ratio. More specifically these figures disclose the technique of effecting, during pressing, relatively larger and smaller ratios of thickness reduction in the aforementioned central and outward zones, respectively.

Figure 24:
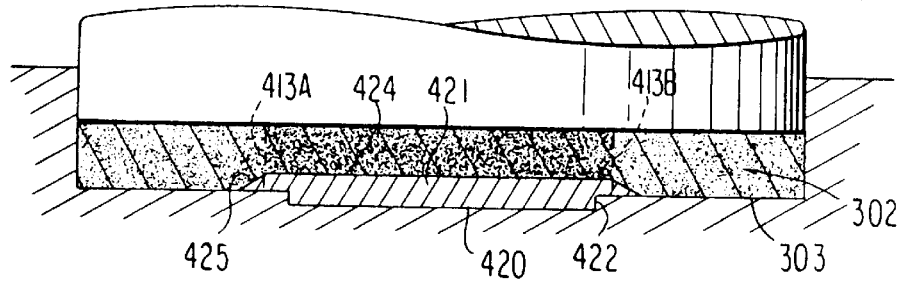
Figure 25:
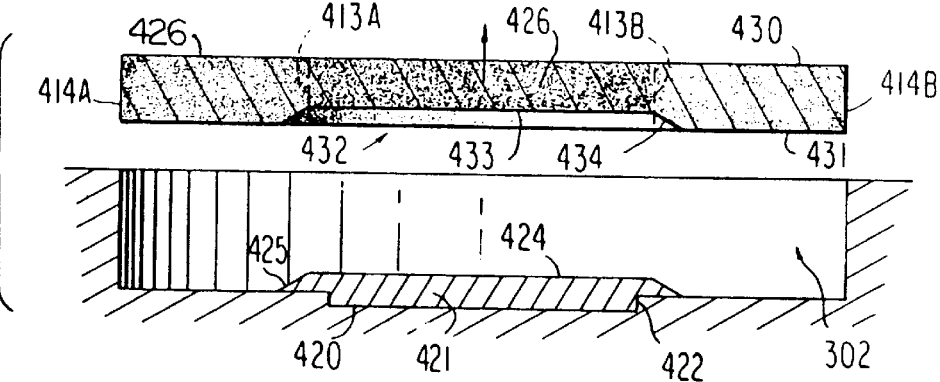
Figure 28A:
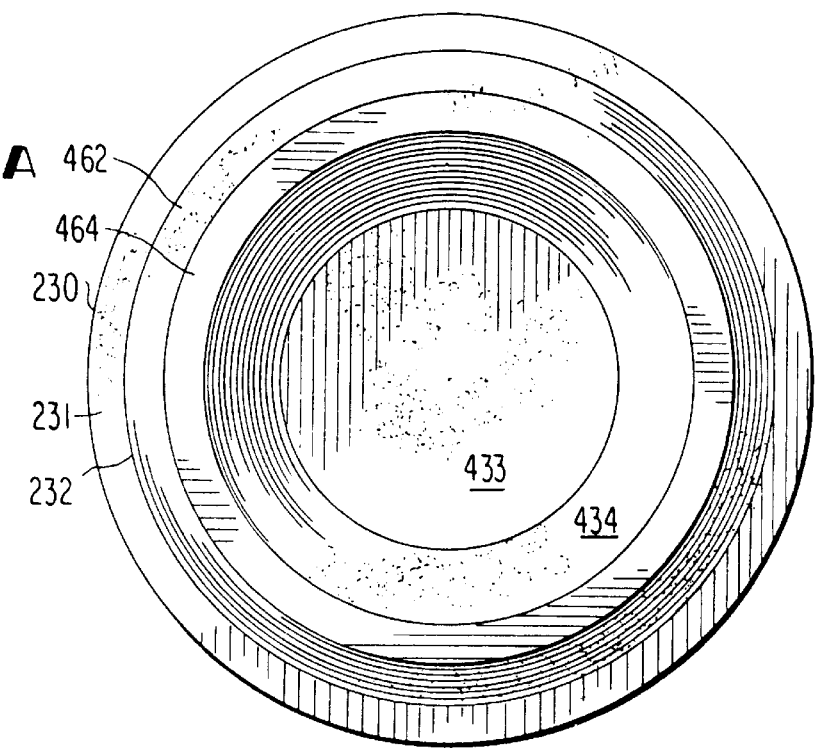
FIG. 28A is a plan view from the top, of the diffusion element of FIG. 28.

According to one of the preferred techniques disclosed in FIGS. 24 and 25, the relatively larger and smaller ratios of thickness reduction are obtained with the assistance of an annular insert 421 constituting a protuberance on the compression face 303 of die cavity 302. Insert 421 includes a lower cylindrical projection 422 which mates with a corresponding socket 420 in die cavity lower wall 303. The upper portion of insert 421 is a shaping member which includes a flat top 424 surrounded by a conical surface 425. When the die cavity 302 of FIG. 24 is filled, and the contents are first made level with upper surface 306 and then compressed as shown in FIG. 24, the resultant compact 426, shown in FIG. 25, includes a planar air infusion surface 430 and a generally horizontal air discharge surface 431 including a central depression 432 having a flat area 433 and a beveled edge 434. This is an example of enhancing the apparent volumetric compression ratio of the central zone of a diffusion element by effecting, during pressing, relatively larger and smaller ratios of thickness reduction in the central and outward zones, respectively. In this case, the respectively larger and smaller percentages of thickness reduction have been effected by performing the pressing in a press having a ram and die cavity with spaced, opposed compression faces with respectively larger and smaller clearances in central and surrounding portions of the space between the faces. In this case, the smaller clearance is provided by a protuberance, i.e. insert 421, on the compression face of the die cavity; but it is also possible to carry out this technique using a die cavity with a flat bottom wall and a protuberance on the compression face of the ram.

One can make a wide variety of modifications to the article and manufacturing technique shown in FIGS. 24 and 25 without departing from the invention. The shape, depth and area of the depression 432 may be freely varied to obtain the desired level of uniformity of air distribution at the gas discharge surface 431 of the element. The shape of the depression may include any desired outline which contributes to uniform distribution of air flow; but preferably the outline of the depression is similar to the outline of the element. Within the outline of the depression, there may be a wide variety of shapes as viewed in transverse cross section. The floor of the depression may be composed wholly of straight or curved surfaces or a combination of straight or curved surfaces. The center of the depression may be flat as shown, or gently curved throughout or may be in the form of an extremely flat cone or may have any other convenient or desireable shape which accomplishes the purposes of the invention. The showings of depressions including flat areas and beveled edges shown in the drawings herein are simple and preferred but are by no means intended to limit the invention.

As indicated above, the area of the central depression is not necessarily coextensive with the area which establishes the central zone of the element. The depression may terminate within or extend beyond the area which defines the central zone. However, it is convenient for purposes of design to establish the area of the depression in such a way that it is coincident with the area which defines the central zone of the element.

One may select any combination of area and average depth for the depression which are sufficient for significantly enhancing the uniformity of gas distribution laterally across the gas discharge portion of the element. For example, the area of the depression may comprise about 10 to about 80 percent, preferably about 25 to about 70 percent and more preferably about 45 to about 65 percent of the total area of the element gas discharge surface or of the total area of the element, while the average depth of the depression may be about 2 to about 20 percent, preferably about 4 to about 15 percent and more preferably about 5 to about 10 percent of the average thickness of the horizontal portion of the element.

The depth of the element may vary within its outline in either a stopwise or gradual fashion, the latter being preferred. Most preferably the variation occurs gradually along gradually sloping portions of the gas discharge surface. It is also contemplated that there may be certain areas within the outline of the depression in which there is no depression. Such is illustrated by FIG. 26.

FIG. 26 discloses an element which can be formed for example, by a modification of the technique shown in FIG. 25. The insert 421 is replaced by an annular insert 440 having an annular rib 441 in its underside which engages a correspondingly shaped annular channel 442 in the bottom wall 303 of die cavity 302. Annular insert 440 includes a flat top 443 with beveled inner and outer edges 444,445. When the thus modified die cavity 302 is employed, the resultant element, shown in the upper portion of FIG. 26, includes a depression 449 of annular shape, having tapered edges 440,441 and including a non-depressed center portion 452. Within the body of the circular element thus formed is a circular central zone whose boundaries are indicated by 413A,413B, surrounded by an outward zone extending from 413A,413B to the cylindrical peripheral surface of the element indicated by 414A,414B.

As illustrated in FIG. 27 the outward zone of the element does not necessarily extend to its extreme peripheral edge. The cylindrical die cavity 302 includes a circular insert 421 in its bottom wall 303. A step is formed about the periphery of bottom wall 303 where it joins side walls 304 and 305, said step including vertical cylindrical surface 324 and horizontal annular surface 325. Production with such a die produces an element as illustrated in the upper portion of FIG. 27. This element includes a gas discharge surface 431 having depression 432 with tapered edges 434 within the bounds 413A,413B of the central zone of the element. The vertical cylindrical surface 324 and horizontal annular surface 325 of the die cause the extreme peripheral portion of the element to include a vertical cylindrical edge 230, horizontal surface 231 and vertical side surface 232 defining a step in the edge of the element. That portion of the volume of the element bounded by planar air infusion surface 430, vertical cylindrical edge 230, horizontal annular surface 231 and reference lines 460A,460B define an annular peripheral zone of reduced permeability, greater density and lesser average height as compared to the permeability, density and average height of the relatively inward and adjoining portions of the element. In this element the outward zone is bounded inwardly by reference lines 413A, 413B and at its outer edge by reference lines 460A,460B.

FIG. 27 represents a way of improving the uniformity of air distribution of a porous gas diffusion element such as for instance that shown in FIG. 20A. Formation of a peripheral zone of lesser height or greater density or lesser permeability affects not only the flow characteristics of the peripheral zone itself, but also the characteristics of the relatively inward portions of the element, tending to concentrate flow in a central zone. By providing an enhanced apparent volumetric compression ratio in the central zone, the foregoing tendency can be countered, equalized or eliminated.

FIG. 28 illustrates how the present diffusion element may include a boundary zone adjacent to a peripheral zone. From the description of the element without a depression in FIG. 20A and the testing thereof as illustrated in that figure, it will be recalled that the vertical side surface 232 of said element tended to exhibit a second minimum 286A,286B of bubble release pressure and a corresponding peak 291A,291B on the flow rate curve 277, indicated by dashed lines 282A, 282B. The tendency for the flow to peak in this area of the element may be considered undesireable, depending on a number of factors such as for instance the type of holder and sealing arrangement adopted in mounting the element in a diffusion system. There the element is mounted in such a manner that it is free to discharge bubbles through vertical side surface 232 into the medium to be aerated, there is a tendency for the surface to produce undesireably large bubbles and high flux rate. Moreover, if the surface 232 discharges into a crevice which can be swept clear of water (and thereby freed of surface tension) by the bubbles emanating from the pores in surface 232, a disproportionate share of the total air flow will be shifted to said surface. This tendency may be countered, equalized or overcome by a variety or combination of techniques including, for example, covering the surface 232 with an impermeable layer which is held or adhered in place, by utilization of seals and diffusion element holders of proper design, by the modification shown in FIG. 28, by a combination of these measures or by any other desired means.

FIG. 28 illustrates a diffusion element which includes a boundary zone adjacent to and inwardly of the peripheral zone, the solid particles having been pressed to a greater apparent volumetric compression ratio in the boundary zone as compared to the aforementioned outward zone. This is accomplished for instance by modifying the die cavity 302 to include a fillet 461 at the base of, and extending inwardly of, the step formed by vertical cylindrical surface 324 and horizontal annular surface 325. This fillet may for instance be at an angle relative to the horizontal, or relative to the surface of the aforementioned outward zone (especially if the latter is not perfectly horizontal), in the range of about 10 to about 70°. In other respects the die of FIG. 28 is identical to that shown in FIG. 27. Thus FIG. 28 is one example in which larger and smaller percentages of thickness reduction have been effected by performing the pressing in a press having a ram and die cavity with spaced, opposed, compression faces and wherein there are relatively smaller and larger clearances in those portions of the space between the faces which correspond to the positions of the boundary zone and the aforementioned outward zone in the diffusion element. In this particular instance, the smaller clearance is provided by a protuberance on the compression face of the die cavity, i.e. fillet 461.

When an element is pressed in the die of FIG. 28, the resultant element shown in the upper portion of FIG. 28 includes a beveled edge 462 which is at an angle alpha relative to the horizontal. For the style of plate shown in FIG. 28, 25° is considered the optimum value of alpha. The benefits of providing the beveled edge 462 were not foreseen when the concept of central volumetric compression ratio enhancement was developed. However, experience gained from working with the central depression concept and the above described bubble release pressure measuring technique have led to some hypothetical explanations for the possible effects of beveled edge 462.

As noted previously, the existence of a low bubble release pressure region in vertical side surface 232 as indicated by the second minima 286A,286B of bubble release pressure curve 276 in FIG. 20A is unexpected. Perhaps this phenomenon may be explained in retrospect by a theoretical consideration of the flow of particles within the die cavity. Inasmuch as the solid particles between ram compression face 318 and horizontal annular surface 325 are subjected to greater compression than the adjoining particles between ram surface 318 and die bottom wall 303, downward and inward force vectors may possibly develop in the material above surface 325 as some of the particles, under compression, migrate downwardly and inwardly in the compact. Vertical side surface 332 may be shielded somewhat from such vectors by the inner edge of horizontal annular surface 325, whereby the material along surface 232 is less compacted than that along surface 231, imparting respectively greater and lesser permeability to said surfaces.

It is theorized that the fillet 461 in the die of FIG. 28 can exert a crowding effect on the material above it, creating next to the outward zone a ring-like boundary zone bounded at its outer edges by reference lines 460A,460B adjacent annular peripheral zone 229 and bounded at its inner edge by reference lines 463A,463B. This, we believe, tends to bring the bubble release pressure—and therefore the potential flow rate—of the surface 232 into a more favorable balance with the remainder of the element, which may be indicated by a reduction in the abovementioned permeability difference.

FIG. 29 discloses an alternative technique for providing the larger and smaller percentages of thickness reduction referred to above. More specifically, in FIG. 29 the smaller clearance is provided by a protuberance on the compression face of ram 317. For example, as shown in FIG. 29 the compression face 318 of ram 317 includes an annular rib which may for instance extend full circle around compression face 318 a short distance inwardly of its peripheral edge. This rib may be of any desired cross section but is preferably arcuate. It may have any suitable depth consistent with the structural integrity of the peripheral edge of the element and which is suitable for producing the desired enhancement of apparent volumetric compression ratio. Representative depths would be those stated above for the central depression 432.

In this embodiment, the die cavity 302 may include the fillet 461 of FIG. 28 but preferably is like the die cavity of FIG. 27 having insert 421 and a step defined by surfaces 324 and 325. When this die cavity and the ram 317 of FIG. 29 are employed, the resultant element is as shown in the central portion of FIG. 29. The annular rib 466 produces a corresponding annular groove 467 in the air infusion surface 430 of the element. The groove 467 may be positioned so that its shape intersects with or is slightly inward of the edge of the peripheral zone or the projected surface of vertical side surface 232. Thus, while annular groove 467 should be situated at least in part within the boundary zone of the element, it may project to some extent into the peripheral annular zone 229. An element having an annular groove 467 positioned as shown in FIG. 29 will include central, outward, boundary and annular peripheral zones delineated by reference lines 413A,413B; 463A,463B; 460A,460B; and vertical cylindrical edges 230 in the same general manner as the element of FIG. 28.

Elements with boundary zones are illustrated by FIGS. 28 and 29 and have the advantage that their side surfaces 232 have an increased bubble release pressure. Thus they may suffer less or not at all from the disadvantages described above in respect to the FIG. 20A and 27 element. Thus, diffusion elements with or without central enhancement of apparent volumetric compression ratio, and with peripheral zones that have been rendered semi-permeable or substantially non-permeable, can be improved if desired by enhancement of the apparent volumetric compression ratio in a boundary zone adjacent to and inwardly of the peripheral zone.

Figure 30:
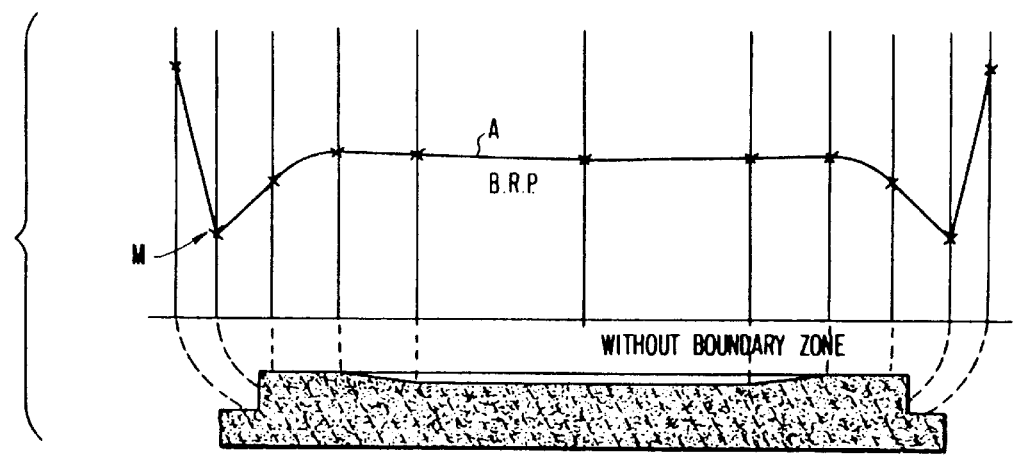
FIG. 30 is a transverse cross section of a diffusion element in accordance with FIG. 27 and an associated bubble release pressure plot exemplary of said element.
Figure 31:
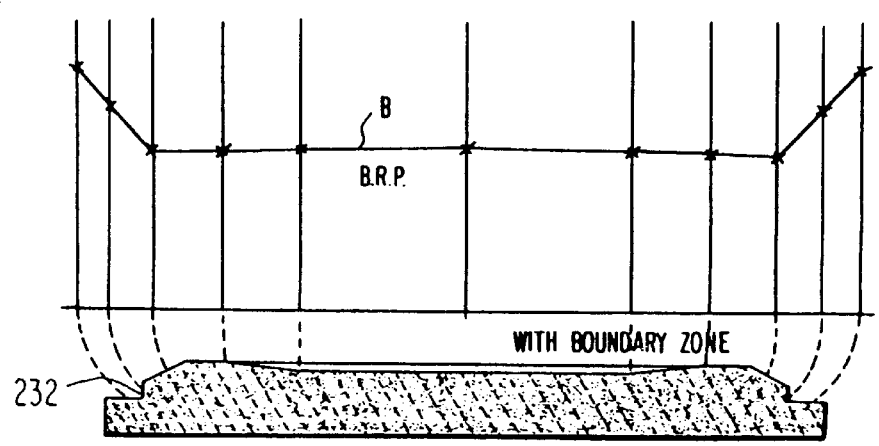
FIG. 31 is a transverse cross section of a diffusion element in accordance with FIG. 28 and an associated bubble release pressure plot exemplary of said element.

The benefits of providing a boundary zone are illustrated graphically in FIGS. 30 and 31, which show respectively the diffusion elements of FIGS. 27 and 28, without and with boundary zones, respectively. Using the bubble release pressure testing procedure of FIG. 20A and a form of graphical representation similar to that Figure, one may develope bubble release pressure (BRP) curves A and B for the respective elements. Comparison of these curves shows that without the boundary zone there is a minimum M in the bubble release pressure curve at the element vertical side surface 232. When the boundary zone is provided, the bubble release pressure is increased in the area of surface 232 as shown by curve B in FIG. 31. In view of the inverse functional relationship of flow to bubble release pressure, the presence of the boundary zone enables one to control the flow from surface 232, making it less than the flow through the center of the element.

Although the benefits of the boundary zone have been illustrated above by its effect upon a vertical surface, i.e. surface 232, the vertical surface is not required. The upper surface of the boundary zone may for example be a non-vertical surface, such as an outwardly and downwardly inclined surface extending all the way from the upper surface of the element to the upper surface of the peripheral zone at an angle of depression of, for example, about 30 to about 70 degrees, and more preferably about 35 to about 60 degrees, relative to the horizontal.

In FIGS. 23 through 29 there have been shown diffusion elements in which reference lines such as 413A,413B; 460A,460B; 463A,463B and so forth have been used to generally indicate the lateral bounds of various zones such as the central zone, outward zone, boundary zone and peripheral zone. These reference lines have not been drawn to scale nor should they be taken to mean that there should be a clearly identifiable vertical line of demarcation between the respective zones in actual products according to the invention. In diffusion elements within the scope of the invention, it may not be possible to draw any line of division between zones where material of significantly greater and lesser density or compaction will be found immediately to either side of the division between two zones. Rather these bounds have been given to illustrate the lateral extent of a volume which, when compared as a whole with an adjacent volume, exhibits the desired difference in apparent volumetric compression ratio.

It is believed that many applications of the invention will involve elements wherein the apparent volumetric compression ratio of the central zone has been enhanced, relative to the outward zone, by at least about 2%, more particularly about 2 to about 20% and preferably about 3 to about 15%. The foregoing percentages are obtained by expressing the difference in apparent volumetric compression ratios of the two zones as a percentage of the volumetric compression ratio of the outward zone. Similarly, most applications of the invention will involve enhancement of the apparent volumetric compression ratio of the boundary zone, relative to a further portion (such as the outward zone) of the diffusion element surrounded by the boundary zone, by at least about 10%, more particularly by about 10 to about 35% and preferably by about 35 to about 100%.

In principle, the invention is not limited to diffusion elements of a specific pore size, but many applications of the invention will involve diffusion elements in which the pore size is in the range of about 60 to about 600 microns, more particularly about 90 to about 400 microns and preferably about 120 to about 300 microns as computed in applying the bubble-release pressure to the equation shown in ASTM E-128 D=30 $\gamma$/P wherein D=maximum pore diameter, $\gamma$=surface tension of the test liquid in dynes/cm, and p=pressure in mm of Mercury.

Generally, unused diffusion elements in accordance with the invention will have a specific permeability in the range of about 6 to about 200 SCFM, more particularly about 12 to about 70 SCFM and most preferably about 15 to about 35 SCFM in the case of alumina and silica sewage aeration diffusion elements.

While most diffusion elements in accordance with the invention will have a bubble release pressure in the range of about 2 to about 20, and more particularly about 4 to about 15, the most preferred bubble release pressure for the preferred sewage aeration diffusion elements disclosed herein is about 5 to about 10.

The above-described techniques of enhancement of apparent volumetric compression ratio may be used to produce any desired amount of improvement in the uniformity of flow distribution across a diffusion element, and it would be virtually impossible to predict the minimum degree of improvement which might ever be considered functionally significant, given the potential for changes in the quality of instrumentation and technological need. However, certain classes of diffusion elements are illustrative of the type of benefits which can be produced. These include diffusion elements wherein the coefficient of variation of the gas discharge surface is not greater than about 0.25, based on the values of bubble release pressure measurements of at least five equally spaced points along each of two perpendicular reference lines extending across the surface of the element and through the center thereof. More preferred examples include diffusion elements, as just described, in which the coefficient of variation is in the range of about 0.05 to about 0.25 or more preferably less than about 0.05.

As previously disclosed the solid particles in the boundary zone of a diffusion element according to the invention can be pressed to a greater apparent volumetric compression ratio as compared to the particles in the outward zone by forming the upper gas discharge surface above the boundary zone with a downward and outward slope at an angle of depression in a range of about 10 to about 80 degrees relative to the horizontal, with many applications of the invention falling in the range of about 20 to about 70 degrees and more preferably about 25 to about 65 degrees, with about 25 degrees being considered the optimum for the preferred sewage aeration elements.

Figure 32B:
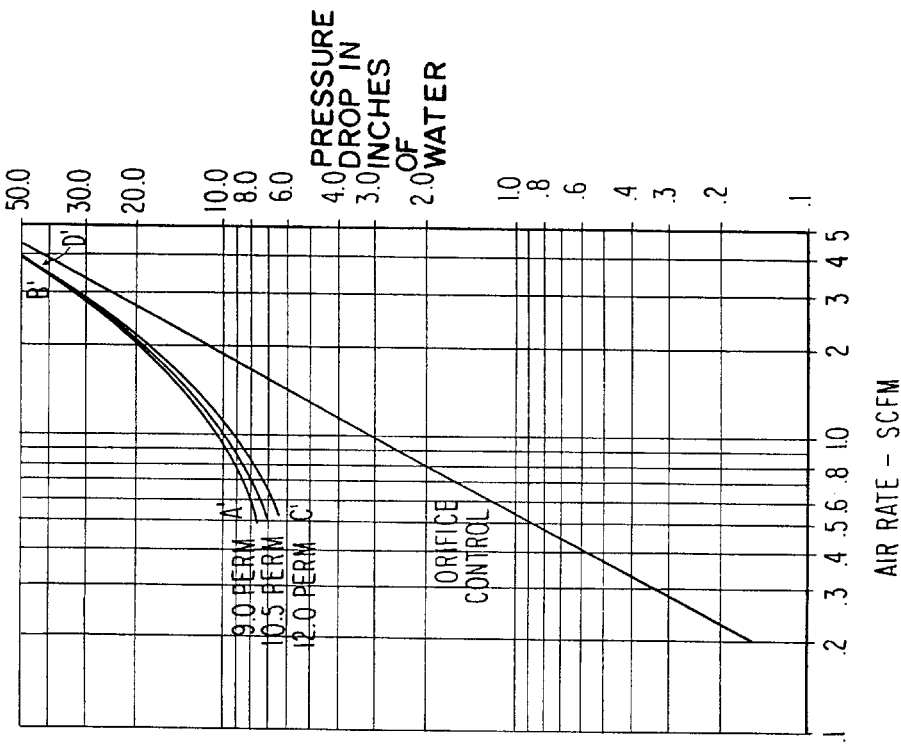
FIGS. 32A and 32B are pressure versus flow diagrams illustrating the benefits of a preferred embodiment of the invention in which a plurality of diffusion elements each have their own individual flow regulating means.
Figure 32A:
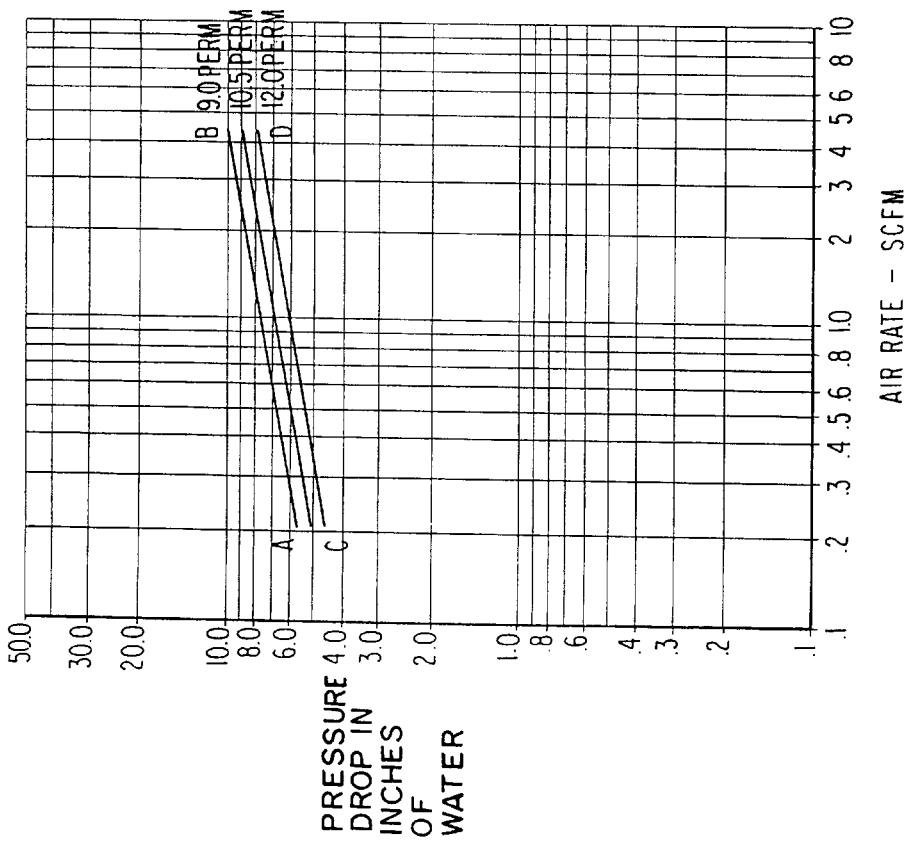

When at least a portion (including all) and preferably at least a major portion of the diffusion elements in a given gas treatment system are mounted on separate or individual plenums, so that each of the respective plenums and each of the respective elements in such portion are supplied with treating gas and/or cleaning gas through separate or individual flow control means, certain advantages accrue in respect to gas distribution and/or fouling rate and/or cleaning efficacy. The flux rate or rate of gas discharge per unit area of a multi-pore diffusion element influences the size of the bubbles formed and the efficiency of the diffusion element expressed as the fraction of oxygen or other treating gas absorbed, e.g. oxygen transfer efficiency (OTE). Generally higher flux rates result in lower efficiencies. Further, with a given number of elements being supplied a given rate of air, the maximum efficiency will be obtained when all the diffusion elements are operating at a uniform flux rate. However, in the manufacture of diffusion elements there are usually variations in such properties as permeability, dynamic wet pressure and others. More specifically, diffusion elements which are nominally made in the same way, to the same specifications, can differ significantly from one another in permeability and other properties. FIGS. 32A–32B illustrate how the resultant pressure/flow relationships of such elements can also differ significantly.

Assume that there are two diffusion elements, one having a permeability of about 12 and the other having a permeability of about 0. Assume further that they are mounted without the above-mentioned separate or individual flow regulating means in such a manner as to be supplied with air at substantially the same pressure through a common plenum to deliver a combined flow of approximately 2.6 SCFM for an average of about 1.3 SCFM per element.

Curves AB and CD respectively of FIG. 32A indicate the air rates for the above elements at various pressure drops, measured in inches of water gauge, while an intermediate curve provides similar information for an element of average (10.5) permeability. At a typical pressure drop of about 7 inches in water gauge, it will be seen that the flow rate through the element having a permeability of 9 will be about 0.6 SCFM, while the flow for the 12 permeability element will be about 2.0.

FIG. 32B is a plot of the pressure flow characteristics of the same two elements mounted on separate plenums which are furnished with air from a common distribution pipe, each through a 5/16 inch diameter control orifice. In FIG. 32B, the curves A'B' and C'D', respectively indicate the air rates for the above elements at various pressure drops, while an intermediate curve provides similar information for an element of average permeability. From the figure it may be seen that in order to discharge 2.6 SCFM through the two diffusion elements, (average of 1.3), the pressure drop would rise to about 11.0 inches of water gauge due to the effect of the orifice control. The corresponding flow through the 9 permeability element would be about 1.2 SCFM while the flow through the 12 permeability element would be about 1.4. The ratio of the flux rates of the two elements in this case is about 1.2:1 rather than about 3.3:1 as it was in the first case. The air and the power required to provide it will be more effectively used in diffusion elements with separate flow regulating means than in diffusion elements not so equipped.

Additional advantages accrue from the use of individual plenums fed through individual flow regulators. In the case of some organic slimes which are believed to foul the diffusion element surfaces more severely at low flux rates, the disparity between flux rates of diffusion elements of different permeabilities increases more rapidly with time when the elements are mounted on a common plenum, than when they are mounted on separate plenums with individual flow regulating means. Additionally, in cleaning, those elements which have lowest permeability and may thus be most in need of cleaning will receive the least cleaning gas. Unfortunately, those elements which have the highest permeability, and may thus have a lesser need of cleaning, will receive the most cleaning gas. Moreover, the disproportionate flow relationship just described tends to become more aggravated as the cleaning cycle progresses and the more permeable diffusion elements become clean.

According to one embodiment of the invention, the use of elements with separate or individual flow control means as above described is preferably practiced in a system in which at least about 90% (and preferably about 95% or more) of the diffusion elements which receive gas at a uniform pressure are capable when new and preferably also after use and thorough cleaning of delivering a flow rate in SCFM per square foot, which is within about +/−15% and more preferably within about +/−10% of the average flow rate of all such elements, when operated at 2" w.g. in a dry unsubmerged condition.

Figure 33:
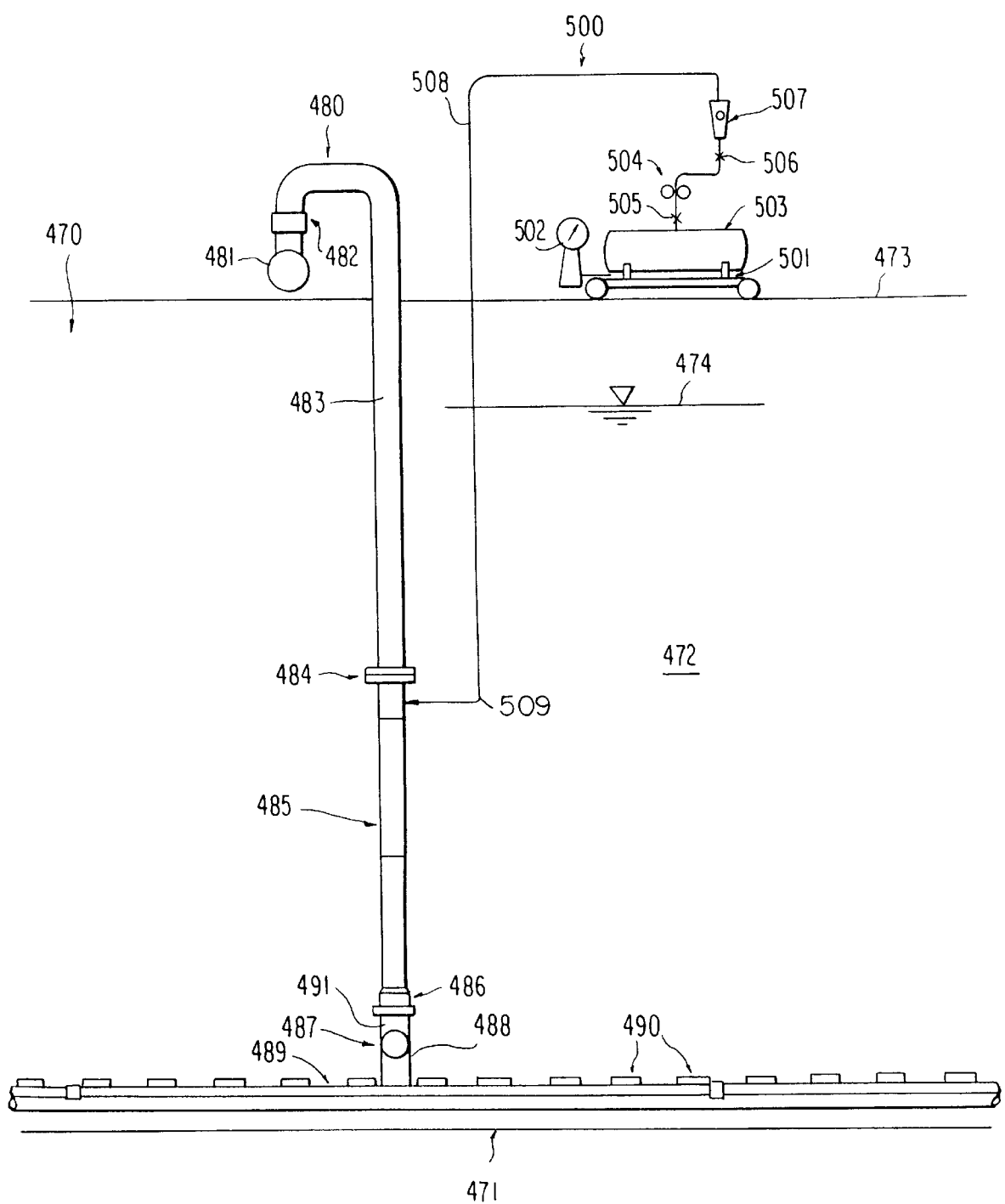
FIG. 33 is a partly schematic diagram of the presently preferred embodiment of a tank-type sewage aeration system including means for supplying and mixing aeration gas and cleaning gas and for discharging same through area-release multi-pore diffusion elements.

A particularly preferred embodiment of the invention is shown in FIG. 33, in which may be seen a schematic representation of a portion of an aeration system for a tank type aeration process. The tank 470 comprises a bottom wall 471 and upright walls including wall 472 which contain a liquid medium having an upper surface 474. Wall 472 has its upper edge 473 at ground level, adjacent to which is a walkway (not shown) provided with the usual safety rails (not shown). In this case, the treatment gas system 480 is an aeration network including blowers (not shown), equipped with the usual filters, pressure regulators, valving and the like, connected to supply air to yard piping 481. Through a follower flange 482 the latter supplies air to a stainless steel drop pipe 483 which extends from a position above the water surface 474 to a coupling 484 below the water surface. At coupling 484 a further drop pipe of corrosion resistant material such as PVC or polybutylene plastic pipe is joined to the first drop pipe 483. The second drop pipe 485 extends further downward in the tank to a slip flange 486 and T arrangement 491 through which drop pipe 485 communicates with a generally horizontal header pipe 487 extending generally perpendicular to tank wall 472. Through a plurality of short vertical connectors 488 extending downwardly from header 487 the latter is connected to a plurality of parallel air distribution pipes 489 which extend generally parallel to tank wall 472. Arranged along distribution pipes 489 at suitable intervals, e.g. about 1 to about 4 feet, are a plurality of diffusers 490 comprising a combination of flow regulating means, plenums and diffusion elements depicted in FIGS. 2 through 6. The diffusion elements have the preferred characteristics set forth herein for multi-pore diffusion elements, exhibit the characteristics and dimensions set forth in respect to the diffusion elements depicted in FIGS. 3, 4, 28 and 28A and have an average permeability of about 10.5 +/−15% for a 0.41 sq.ft. by 1 in. thick element.

The gas cleaning system 500 of this embodiment includes a traveling scale 501 equipped with rollers whereby it may be moved along the above mentioned walkway at the tank edge 473 and has an indicator 502. A cylinder 503 for the storage and discharge of cleaning gas rests on the traveling scale 501 and is connected via gas regulator 504, valves 505,506, flow meter 507, plastic tubing 508 and elbow 509 to that portion 485 of the drop pipe which is of plastic material and is situated below the water line 474. In this schematic view the plastic tubing 508 is shown to be spaced from the drop pipe sections 483,485 but in actual practice it will be beneficial to strap the plastic tubing securely to the exterior of the drop pipe or to run the tubing along the inside of the drop pipe sections.

The cylinder 503, scale 501 combination above is considered the most convenient arrangement at present for supplying cleaning gas. However a wide variety of alternatives are possible, only a few of which can be referred to herein. For example the cylinder 503 may be replaced by a burner which is adapted to burn a fuel such as sulphur that can be oxidized to a cleaning gas such as sulphur dioxide. Alternatively the cylinder could be replaced with a liquid-gas contacting apparatus in which a liquid source of cleaning gas, such as aqueous acid or solvent, is sprayed in concurrent or countercurrent flow with treatment gas whereby the cleaning gas is introduced into the treatment gas by vaporization or extraction. If carbon dioxide is employed as cleaning gas, it may be obtained from anaerobic digester gas which typically contains both carbon dioxide and methane, from which the carbon dioxide may be stripped and recovered for use as cleaning gas. Moreover, the methane may be burned to produce energy, water and carbon dioxide which may additionally be employed as cleaning gas.

However, for reasons of efficacy, cost and ready availability, the use of HCl is considered to be best. Mole fractions of HCl gas to air in the range of about $7.5 \times 10^{-5}$ to about $3.1 \times 10^{-2}$ or more may for example be used. Against foulants similar to those described in the examples which follow it is contemplated that HCl gas added at a mole fraction of about $3.1 \times 10^{-2}$ would require a cleaning cycle in the range of about 30 to 40 minutes while a mole fraction of about $6.6 \times 10^{-3}$ would require approximately 4 times as long. In either case the total amount of gas consumed would be about 0.25 pounds per diffusion element. At a gas cost of about $0.50 per pound the material cost to clean a diffusion element would be about $0.125. This compares favorably with the cost of refiring the diffusion elements which has been estimated at up to $7.00 per element. It should of course be appreciated that the above mentioned times and gas consumption will vary widely depending on the nature of the foulant deposit(s).

It is our present recommendation to clean the above described 0.41 sq.ft. diffusion elements at a rate of about 2.5 to about 3 SCFM per element which is the approximate equivalent of about 6 to about 8 SCFM per square foot of active discharge area. In general it is recommended that the mole fraction of HCl should be about $4 \times 10^{-5}$ or more, preferably about $8.6 \times 10^{-5}$ or more and most preferably about $4 \times 10^{-4}$ or more, with about $5.7 \times 10^{-5}$ to about $3.1 \times 10^{-2}$ and about $6.6 \times 10^{-3}$ to about $3.1 \times 10^{-2}$ being particularly preferred ranges. It is understood that the above mole fractions are all applicable to use at atmospheric pressure. Where gas pressure at the point of bubble release is other than atmospheric, the values should be corrected by multiplying by 760 and dividing by the total gas pressure at the point of bubble release, expressed in mm of mercury.

Definitions

Apparent Volumetric Compression Ratio

For purposes of the present invention the "apparent volumetric compression ratio" is used as a basis for comparison of two or more zones of an element formed from a body of solid particles which has been shaped, pressed and rendered coherent by bonding or sintering in a compacted form having pores. As applied to a given zone, said ratio constitutes the quotient obtained when the height of material prior to pressing is divided by the height of material after pressing within said zone. Although it is recognized that pressing may cause some lateral migration of material from one zone to another, with limited effects on the observed compression ratio, such migration can be and normally is ignored, hence the reference to the compression ratio as "apparent". If the height of material differs at different locations within a zone either prior to or subsequent to pressing, an average height is used which is weighted on the basis of area in plan view. The height of all material subjected to compression is considered part of the height prior to compression. Therefore, if an additional height of material is placed upon an original quantity of material which has already been compacted, such as by preliminary partial pressing or vibration compaction, the height of the added material is included in the computation; more specifically, in determining the quotient, the divisor is the fully compacted height of all the material and the dividend is the uncompacted height of both the original and additional material.

Base Condition

This refers to a dynamic wet pressure or to a mean bubble release pressure exhibited by a multi-pore diffusion element at a selected point in the operational history of the diffusion element. It is permissible, for example, to employ as the base condition that pressure exhibited by a multi-pore diffusion element under any of the following circumstances or under whichever of the following circumstances last occurred in the operational history of the element; (a) when first put into operation in the treatment of a liquid medium containing at least one foulant, (b) when last cleaned with a cleaning gas, (c) when last cleaned with means other than cleaning gas, (d) when last maintained in contact with a liquid medium without discharging gas, or (e) at the lowest pressure previously recorded.

According to a particularly preferred embodiment of the invention the dynamic wet pressure or mean bubble release pressure base condition is that pressure exhibited by the element when manufactured or when first put into operation in the treatment of a liquid medium containing at least one foulant. The base condition just described may be and preferably is employed as the base condition in a first and/or subsequent gas cleaning of the element. Thus, according to a particularly preferred embodiment of the invention the reduction of dynamic wet pressure or mean bubble release pressure or both in a first and at least one subsequent gas cleaning is substantial and is calculated based on the base condition of the diffusion element as manufactured or when first used. Preferably, in each of a plurality of distinct, consecutive gas cleaning operations, cleaning is conducted until there has been substantial reduction of the pressure increase relative to the base condition of the element when manufactured or first used.

In a first or subsequent gas cleaning, especially during the first gas cleaning, such reduction may exceed the difference between the element dynamic wet pressure or mean bubble release pressure when manufactured or first used, and the corresponding value of either of such variables as of the commencement of a gas cleaning operation in accordance with the invention.

Boundary Zone

A "boundary zone" may be situated adjacent to and inwardly of a peripheral zone, when such is present, and may be situated between the peripheral zone and the outward zone preferably adjacent the outer edge of the outward zone. It is a zone in which there is a progressive increase, continuous or stepwise, in the apparent volumetric compression ratio of the element in the direction of the peripheral zone, or towards a vertical surface which is near the periphery of the element, which surface may for example be a portion of the side of an element, which portion is inwardly of and in or adjacent to the peripheral zone.

Bubble Release Pressure

The "bubble release pressure" is used to characterize resistance to discharge of a gas such as air under a liquid medium such as water from a point or area on any surface of a diffusion element. As applied to a given point of a given element it constitutes the quasi-static pressure which must be applied to release a bubble from said point on the gas discharge surface. As applied to a given area of the active gas discharge surface area of a diffusion element, which given area may include all or a part of the active area, the bubble release pressure is the mean of the bubble release pressures observed at a statistically significant number of points distributed over said area in a random or uniform manner. For purposes of this disclosure the bubble release pressure is expressed in terms of inches of water gauge, after deduction of the hydrostatic head. The test may be conducted using the apparatus disclosed in the above description of FIG. 20 of this specification, or any other apparatus capable of producing data similar to or convertible to an indication of bubble release pressure. The values of bubble release pressure set forth herein were determined on "quasi-static" basis in that the test apparatus was adjusted to a sufficiently low rate of flow to release bubbles slowly enough, so that the bubble release pressure observed would be substantially that which would be obtained under static conditions.

Center

The term "center" refers to the position centroid or geometric center of the active gas discharge surface or of the center of the element itself in plan view, whether the element is of regular or irregular shape.

Central Zone

The "central zone" of a diffusion element in accordance with the invention constitutes a central portion of the volume of the diffusion element which lies beneath a central area constituting a stated percentage of the total active gas discharge area of the element, it being understood that the bounds of said volume may or may not coincide with the position or positions of the edges of certain depressions which may he applied to the surface(s) of the element in accordance with the present invention. The "central zone" applies to diffusion elements of varying outline in plan view, whether circular, oval, square, rectangular, polygonal, irregular or otherwise, and the above-mentioned central area has a similar outline to, and a common center with, the active gas discharge surface of the element. In general, the central area which establishes the bounds of the central zone may constitute up to about 80% of the total active gas discharge area, more preferably about 60% and more preferably about 40%.

Cleaning

Cleaning is a process of preventing, retarding or removing foulant deposits in multi-pore diffusion elements with cleaning gas, which is effective against potential or actual flow effects on a multi-pore diffusion element which are or would be attributable to the presence of foulant deposits in or adjacent its gas discharge passages. Such removal of deposits substantially reduces any increased level of dynamic wet pressure and/or bubble release pressure, above the corresponding base condition, attributable to the aforementioned deposits.

Cleaning Gas

A cleaning gas is a gas, as defined herein, which when introduced into the gas discharge passages of a multi-pore diffusion element alone or in admixture with other gases, including treatment gas, in a given concentration and in a given amount, is sufficiently aggressive toward foulant deposits to accomplish cleaning. Such gases may act in any effective mode, such as for example: by dissolving the foulant, especially in the case of precipitated inorganic salt deposits; by dissolving material which attaches the foulant to the diffusion element by destroying the bond between the foulant and the element; by poisoning, especially in the case of living foulants which may by poisoning be caused to detach from the diffusion element in any other suitable mode; or in a combination of modes. Thus, for example, the cleaning gas may be or include one or more gaseous (including vaporized) organic and/or inorganic solvent compounds or mixtures of solvent compounds including those compounds capable of existing as liquids and those capable of existing as gases at 20° C. and standard atmospheric pressure. Examples include $H_2O_2$, $CH_3OH$ and other volatile organic solvents. But the preferred cleaning gases are those which exist as gases at 20° C. and which give an acid reaction when dissolved in water, such as for example, $SO_2$, $SO_3$, $CO_2$, $Cl_2$ $ClO_2$, HCl, $NO_x$, $O_3$, $Br_2$, and the like, HCl being particularly preferred.

Coefficient of Variation

For purposes of the present invention, the "coefficient of variation" is the quotient obtained by dividing the "standard deviation" by the "mean". The "standard deviation" represents the root mean square of the deviations from the mean of a stated number of bubble release pressure measurements. The "mean" is the arithmetic average of the aforesaid bubble release pressure measurements. Optimum accuracy is obtained by determining bubble release pressure at random points representative of substantially the entire gas discharge surface of the element, but we have found that with circular plates we can obtain information that is sufficiently accurate to be useful by sampling the bubble release pressure at at least 5 equally spaced points along each of two mutually perpendicular diameters of the plates.

Dynamic Wet Pressure

The pressure differential between the influent surface of a diffusion element and the hydrostatic head at a point of bubble formation. It is a measure of the resistance to gas flow of an area release diffusion element, including the effects of friction in the gas discharge passages of the element and at the influent and effluent ends of such passages, as well as the effects of surface tension at the effluent ends of the passages. One convenient method for determining the dynamic wet pressure is to determine the difference between the hydrostatic head in the liquid medium at the effluent surface of the diffusion element and the total gas pressure at the influent surface of the element expressed in terms of inches of water gauge.

Foulant

A "foulant" is any material, present in a liquid medium and/or in a treatment gas, which tends to form a deposit at (including in or adjacent) the inlets and/or outlets of gas discharge passages of multi-pore diffusion elements or within such passages in such a manner as to affect the gas pressure/flow relationship such as for example by impeding flow or impairing uniformity of distribution of treatment gas discharged through a given element or group of such elements.

The foulant and/or resultant deposits may be of natural and/or synthetic origin, organic and/or inorganic, living or non-living, and composed of liquid, solid and/or gaseous components. Non-limiting examples of the more common foulants are fungal and bacterial strains, algae, protozoa, rotifers, higher life forms, oily residues, organic pipe coatings, soap and detergent residues, dust, inorganic salts, rust and other metal oxides, and hydroxides, such as for example the carbonates and sulfates of such metals as calcium, magnesium, copper, aluminum, iron and other substances which may be suspended in or dissolved in a liquid medium and be rendered less soluble by any means, especially by discharge of treatment gas into the liquid medium at its interface with a multi-pore diffusion element.

The term "present" is employed in this definition in the broadest possible sense so as to embrace foulants which are present in any form of admixture such as, for example, suspensions, dispersions, emulsions, solutions and other forms.

The deposits are usually, but not necessarily, adherent to the diffusion element and tenacious in the sense that under normal conditions of discharge, the treatment gas will not sufficiently remove them from the diffusion elements to overcome their above-indicated effects on gas flow.

The term deposits is also used in a broad sense to include solid and/or liquid components in the form of pasty, semi-solid or solid particles or masses, such as for example, slimes, scales and other incrustations.

The formation of deposits may occur in any manner such as, for example: by mere lodgment, as when a rust particle borne by treatment gas enters the inlet of a gas discharge passage of a diffusion element and lodges within; by accretion, as when tiny oil droplets and dust particles borne by treatment gas adhere to one another and to the influent surface of the element, combining to form a gradually enlarging mass which partly or fully obstructs the inlets of gas discharge passages; by organic growth, as when one or more life-forms present in the liquid medium at the effluent surface of the diffusion element forms layers or networks at such surface which impede the flow of treatment gas or at least impair uniformity of treatment gas distribution; by ingestion, as when suspended solids in the liquid medium are borne into the gas discharge passages by a reverse flow of liquid medium through the diffusion element when the flow of treatment gas is intentionally or unintentionally suspended; or by precipitation (including crystallization), as when insolubilized inorganic salts are deposited in the gas discharge passages and/or at their outlets during discharge of the treatment gas.

Gas

For purposes of the present invention a gas is a gaseous material or mixture, which may be or include true gases or vapors or mixtures thereof, and which may also include entrained liquids or solids in the form of fine or substantially colloidal droplets or particles, which material or mixture is in the gaseous state to a sufficient extent under conditions of use for forming bubbles when discharged through a multi-pore diffusion element into liquid media.

Liquid Medium or Media

A "liquid medium" is any material (including single materials or mixtures) which is liquid to a sufficient extent to form gas bubbles therein when gas is discharged therein through a multi-pore diffusion element. The liquid material may for example include one or more organic liquids, or one or more inorganic liquids, or any combination of organic and/or inorganic liquids in admixture (including miscible and immiscible liquids) and may also include other liquid, gas and solid materials which do not deprive the medium of the above-described liquidity under the conditions prevailing during discharge of the treatment gas therein. Also, at least one of the components of the medium, which may be one or more foulant(s) and/or one of the other components of such medium, is subject to change in a pre-determined manner in response to discharge of a treatment gas therein. A preferred category of such media is aqueous waste liquors, such as for example, the mixed liquors treated in the activated sludge process, refinery and brewery waste liquors, paper mill white water, and the like.

Mean Bubble Release Pressure

The arithmetic average of a statistically significant number of bubble release pressure measurements at randomly or systematically established locations on any surface of a diffusion element.

Multi-Pore Diffusion Element

In general, such an element is an area release diffuser having an active gas discharge surface of substantial area e.g. usually at least about 20 square inches, more preferably at least about 30 square inches, and still more preferably at least about 40 square inches, having a multiplicity of fine pores closely spaced with respect to one another and distributed in a random or ordered manner throughout said active gas discharge surface. However, it should be understood, for reasons apparent from the above discussion of theoretical considerations, that only a portion of the pores will transmit gas under a given set of operating conditions. On the other hand, there will normally be a plurality of active pores per square inch of active gas discharge area under the design operating conditions of the element, when in its new or as manufactured condition in clear water.

Such elements may include certain optional, additional characteristics or properties, certain of which are preferred embodiments. For example such elements include pores comprising gas discharge passages. Said passages may be essentially linear but are usually tortuous. Although discrete passages are contemplated, elements with substantial numbers or even major proportions of interconnecting passages are more commonly encountered. Irrespective of their degree of linearity, tortuousness, intercommunication or lack thereof, the respective gas discharge passages have discrete or shared inlets at the gas influent surfaces of the elements and outlets at the gas discharge surfaces of the elements. The closely spaced nature of the passages in the preferred elements is indicated in part by the fact that the average lateral spacing between pores is smaller than the average thickness of the elements and is therefore smaller than the average length of the gas discharge passages. The reference to spacing is intended to refer to the spacing between all pores in the diffusion element not merely those which happen to be active at a given set of operating conditions.

It is also preferred that the pores have a pore size which is in the range of about 60 to about 600 and more preferably about 90 to about 400 and most preferably about 120 to about 300 microns, as computed in applying the mean bubble release pressure of the element to the equation $D=30\gamma/P$, shown in ASTM E-128, wherein D=maximum pore diameter, $\gamma$=surface tension of the test liquid in dynes/cm, and p=pressure in mm of Mercury.

The elements may be members of any desired shape in plan view and vertical cross section and, as viewed in vertical cross section, include a substantially horizontal portion having a ratio of at least about 4:1, more preferably at least about 6:1 and still more preferably at least about 8:1 between the maximum horizontal dimension of the element and the area-weighted average thickness of the element.

Said horizontal portion preferably also is characterized by having a ratio of active gas discharge area to average thickness, weighted on an area basis, of at least about 10, more preferably at least about 20 and still more preferably at least about 40 square inches of area per inch of thickness.

Said horizontal portion may and preferably does include, beneath its active gas discharge surface, zones of enhanced volumetric compression ratio. For this purpose the said horizontal portion may be regarded as including various zones (defined herein) referred to as the central, outward, boundary and peripheral zones, which may or may not have visible characteristics, but will usually be associated with depressions at the central zone and/or angled surface(s) at the boundary zone. For example, it is contemplated that the central zone would preferably have an apparent volumetric compression ratio which is enhanced relative to that of the outward zone by at least about 2%, preferably about 2 to about 20%, and more preferably about 3 to about 15%. Where a boundary zone is provided, preferred applications of the invention will involve enhancement of the apparent volumetric compression ratio of the boundary zone, relative to the outward zone, by at least about 10%, more particularly about 10 to about 35%, and preferably about 35 to about 100%.

The diffusion elements may include a wide variety of particulate (including fibrous) materials of both organic and inorganic character, but preferably have a modulus in compression of at least about $0.2 \times 10^5$ psi, more particularly about $0.2 \times 10^5$ to about $4 \times 10^5$ psi in applications involving softer particulate materials, and preferably about $4 \times 10^5$ to about $6 \times 10^6$ psi when working with the harder inorganic materials.

Outward Zone

The "outward zone" includes all or a substantial portion of the body of the diffusion element beneath the total active gas discharge surface other than the "central zone". As compared to the central zone the outward zone lies further outward from the center of the element than the central zone. Other than the central zone, the outward zone may or may not be the sole additional zone in the element.

Oxygen-containing Gas

An "oxygen-containing gas" includes pure oxygen and any gas (as defined herein) that includes oxygen in appreciable quantities and is useful as a treatment gas.

Peripheral Zone

The "peripheral zone", if such is present, constitutes a portion of the volume of the diffusion element at or along the edge of the active gas discharge surface of the element which normally constitutes the outermost edge or periphery of the element. The peripheral zone, whether annular or non-circular, is one in which the element has been treated by pressing, including a combination of pressing with other techniques, to develop a zone having lesser permeability (including no permeability), greater density or lesser height than all or a portion of the outward zone. An element with a peripheral zone may or may not include a boundary zone.

SCFM

SCFM means rate of gas flowing in terms of cubic feet per minute corrected to a temperature of 20° C., an absolute pressure of 760 mm of mercury and a relative humidity of 36%.

Specific Permeability

The term "specific permeability" describes the overall rate of passage of gas through a dry diffusion element, and for purposes of the present invention is expressed in standard cubic feet per minute per square foot of area per inch of thickness at a driving pressure of 2 inches in water gauge under standard conditions of temperature, pressure and relative humidity (20° C., 760 mm Hg. and 36%, respectively). The specific permeability is calculated from the equation $G=Q(t/A)$, wherein G equals specific permeability, Q equals flow in standard cubic feet per minute, t equals thickness of the element in inches and A equals the mean effective gas flow area in $ft.^2$ through the element normal to the direction of flow. If the gas discharge surface of the diffusion element overlies portions of the element which are of varying thickness, the average thickness is used, the thickness being weighted on the basis of area.

Tank-type Process

For purposes of the present disclosure, a tank type process, whether for aeration or other purposes, is a process of discharging treating gas into a liquid medium at a rate of at least about 2, more preferably at least about 4, and still more preferably at least about 6 SCFM per 1000 cubic feet of liquid medium, a rate which is far in excess of those employed in the sewage treatment lagoons or ponds in which tubing type diffusers are installed. Alternately, or in combination with the foregoing, a tank-type process may be characterized by an average liquid medium retention time of less than about 48 hours, more commonly less than 24 hours, and quite frequently less than 12 hours, considerably less than the retention times of the aforementioned lagoons or ponds.

Treatment Gas

This is a gas, as defined herein, which includes one or more components that is able to effect a predetermined desired change in at least one component of a liquid medium, and is less aggressive towards foulant deposits than a cleaning gas, as defined herein.

Vertical

The term "vertical", as applied to a surface of a diffusion element, includes truly vertical and near vertical, e.g. within about 20° of vertical.

What is claimed is:

1. Wastewater treatment apparatus comprising:
    a tank, having a bottom surface, equipped for biological treatment of said wastewater;
    a gas distribution network in said tank including generally horizontal acid resistant supply piping in said tank positioned above said bottom surface and having synthetic resin inner surfaces;
    a compressor or blower for introducing air into said network;
    a high pressure storage vessel for introducing HCl gas into said network, intermittently, alone or in admixture with said air;
    a plurality of flow regulating orifices of fixed or auto-adjustable size distributed about a submerged portion of the network for receiving the aforementioned air and HCl gas and for discharging them at predetermined flow rates into a plurality of plenums downstream of the flow regulating orifices;
    a plurality of multi-pore ceramic flat plate diffusion elements, free of fastener through holes, in communication with said plenums for receiving said gases, said diffusion elements being members each comprising a multiplicity of closely spaced fine pores of about 120 to about 300 microns in diameter defining paths for discharge of said gases and which exhibit an increase in dynamic wet pressure, as compared to a base condition of said pressure, as a result of deposition of foulants, each of said diffusion elements having, and being in communication, through its plenum, with its own individual flow regulating orifice;
    at least about 90% of said diffusion elements being capable, when new, of delivering a flux which is within about +/−15% of the average flux of all such elements, when operated at 2 inches of water guage in a dry unsubmerged condition;

said diffusion elements having central and boundary portions with enhanced volumetric compression ratios, said central portions having volumetric compression ratios of about 2 to about 20% relative to the portions of the elements surrounded thereby and said boundary portions having outwardly and downwardly inclined upper surfaces at an angle of depression of about 35 to about 60 degrees relative to the horizontal and having volumetric compression ratios of about 10 to about 35% relative to the portions of the elements surrounded by said boundary portion;

said diffusion elements each having a bubble release pressure of about 5 to about 10 inches of water guage and a coefficient of variation not greater than about 0.25, said coefficient of variation being based on the values of bubble release pressure measurements at, at least, about 5 equally spaced points along each of two mutually perpendicular reference lines extending across said surface and through the center thereof;

said plenums, mounted on said piping at elevated positions relative to said bottom surface, each comprising gas-tight enclosures that enclose the lower surface of said diffusion elements and include upstanding walls facing and adjacent to the sides of the diffusion elements, the peripheries of said elements having annular steps formed about the upper portions of the peripheral surfaces of the diffusion elements for positioning sealing O-rings on said annular step for sealing contact with the respective plenums and elements, said sealing O-rings being comprised of resilient, elastomeric material; and retaining rings indirectly in contact with said elements at their respective peripheries for securing said elements around their entire peripheries to their respective plenums, said retaining rings including upright, cylindrical walls and flanges which at least partly overlie the sealing O-rings, said flanges restraining upward movement of said sealing O-rings and elements, whereby said upward force on said elements acts upwardly on said sealing O-rings and against said sealing O-rings, for increasing the sealing integrity of said sealing O-rings and preventing escape of gas from the plenums at the sides of the elements.

2. The apparatus according to claim 1 further comprising measuring means for monitoring operation of said waste treatment apparatus by measuring changes in operating parameters of the apparatus that indicate dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of said elements.

3. Liquid treatment apparatus comprising:
a gas distribution network in a tank;
means for introducing treating gas into said network;
a source of cleaning agent;
means including valve means for intermittently introducing into said network said cleaning agent alone or in admixture with the treating gas;
a plurality of synthetic thermoplastic or thermoset resin plenums;
a plurality of flow regulating means distributed about a submerged portion of the network for receiving the aforementioned treating gas and cleaning agent and for discharging them into a plurality of plenums downstream of the flow regulating means, said flow regulating means tending to promote flow into said plenums at similar rates;
a plurality comprising hundreds of diffusion elements sealingly engaged and in communication with said plenums for receiving said treating gas and cleaning agent, said elements having air diffusion pores extending therethrough, but being free of through-holes other than air diffusion pores, said pores defining paths for discharge of said treating gas and cleaning agent and which exhibit an increase in dynamic wet pressure and/or bubble release pressure as a result of deposition of foulants, each of said diffusion elements being in communication with its own individual flow regulating means through its own individual plenum downstream of the flow regulating means for tending to promote gas flow through said diffusion elements at similar rates;
retaining means engaging said diffusion elements about their peripheries for securing said elements to said plenums;
sealing means adjacent the peripheries of the diffusion elements for preventing leakage of air from said plenums past the peripheries of said elements; and
measuring means for monitoring the operation of said liquid treatment apparatus by measuring changes in operating parameters of the apparatus that indicate dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of said elements.

4. The apparatus according to claim 3 wherein said diffusion elements are divided into at least two groups, said measuring means includes flow measuring means for measuring the respective flow or flows of gas through at least one selected group among said at least two groups, and said apparatus includes controlling means for controlling flow of cleaning agent to one or more of said selected groups.

5. Liquid treatment apparatus comprising:
a gas distribution network in a water impound;
means for introducing treating gas into said network;
a source of cleaning agent;
means including valve means for intermittently introducing into said network said cleaning agent alone or in admixture with the treating gas;
a plurality of synthetic thermoplastic or thermoset resin plenums;
a plurality of a least ten diffusion elements sealingly engaged and in communication with said plenums for receiving said treating gas and cleaning agent, said elements having air diffusion pores extending therethrough, but being free of through-holes other than air diffusion pores, said pores defining paths for discharge of said treating gas and cleaning agent and which exhibit an increase in dynamic wet pressure and/or bubble release pressure as a result of deposition of foulants;
retaining means engaging said diffusion elements about their peripheries for securing said elements to said plenums;
sealing means adjacent the peripheries of the diffusion elements for preventing leakage of air from said plenums past the peripheries of said elements; and measuring means for monitoring the operation of said liquid treatment apparatus by measuring changes in operating parameters of the apparatus that indicate dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of said elements.

6. The apparatus according to claim 5 wherein said diffusion elements are divided into at least two groups, said measuring means includes flow measuring means for measuring the respective flow or flows of gas through at least one selected group among said at least two groups, and said apparatus includes controlling means for controlling flow of cleaning agent to one or more of said selected groups.

7. The apparatus according to claim 3, 5 or 2 wherein said measuring means comprises means for measuring pressure across or flow of gas through one or more diffusion elements.

8. The apparatus according to claim 3, 5 or 2 wherein said measuring means comprises means for measuring the pressure across and flow of gas through one or more diffusion elements.

9. The apparatus according to claim 3, 5 or 2 wherein said measuring means comprises means for measuring said changes with sufficient precision to maintain the dynamic wet pressure across the diffusion elements in a range not to exceed about 15 inches of water gauge above said base condition.

10. The apparatus according to claim 3 or 2 wherein said measuring means comprises means for measuring the hydrostatic pressure of said liquid at about the elevation of the diffusion elements, means for measuring gas pressure within a plenum downstream of a flow-regulating means, and means for measuring the gas pressure within a header supplying gas to said flow regulating means.

11. The apparatus according to claim 3, 5 or 2 wherein said measuring means includes means for measuring the dynamic wet pressure across one or more of said diffusion elements.

12. The apparatus according to claim 3 or 5 wherein said sealing means, retaining means and plenums jointly restrain vertical movement of said diffusion elements.

13. Liquid treatment apparatus comprising:
a gas distribution network in a tank;
a source of treating gas;
a source of cleaning agent;
a flow control device located in a flow path between said source of cleaning gas and said gas distribution network;
a plurality of synthetic thermoplastic or thermoset resin plenums;
a plurality of flow regulators distributed about a submerged portion of the network capable of receiving the aforementioned treating gas and cleaning agent and discharging them into said plurality of plenums downstream of the flow regulators, said flow regulators tending to promote flow into said plenums at similar rates;
a plurality comprising hundreds of multi-pore area release diffusion elements sealingly engaged and in communication with said plenums for receiving said treating gas and cleaning agent, said elements having air diffusion pores extending therethrough, but being free of through-holes other than air diffusion pores, said pores defining paths for discharge of said treating gas and cleaning agent, said elements exhibiting an increase in dynamic wet pressure and/or bubble release pressure as a result of deposition of foulants, each of said diffusion elements being in communication with its own individual flow regulator device through its own individual plenum downstream of the flow regulator for tending to promote gas flow through said diffusion elements at similar rates;
retaining means engaging said diffusion elements about their peripheries for securing said elements to said plenums;
sealing means adjacent the peripheries of the diffusion elements for preventing leakage of air from said plenums past the peripheries of said elements; and
at least one measuring device capable of measuring changes in operating parameters of the apparatus indicating dynamic wet pressure changes across the diffusion elements with sufficient precision for initiating the flow of cleaning agent with sufficient frequency for maintaining the dynamic wet pressure across the diffusion elements in a range not to exceed about 25 inches of water gauge above a base condition of said elements.

14. The apparatus according to claim 13 wherein said at least one measuring device comprises pressure or flow measuring devices capable of measuring pressure across or flow of gas through one or more diffusion elements.

15. The apparatus according to claim 13 wherein said at least one measuring device comprises pressure and flow measuring devices capable of measuring the pressure across and flow of gas through one or more diffusion elements.

16. The apparatus according to claim 13 wherein said at least one measuring device comprises at least one device capable of measuring said changes with sufficient precision to maintain the dynamic wet pressure across the diffusion elements in a range not to exceed about 15 inches of water gauge above said base condition.

17. The apparatus according to claim 13 wherein said at least one measuring device comprises at least one device capable of measuring the hydrostatic pressure of said liquid at about the elevation of the diffusion elements, at least one device capable of measuring gas pressure within a plenum downstream of a flow regulator, and at least one device capable of measuring the gas pressure within a header supplying gas to said flow regulator.

18. The apparatus according to claim 13 wherein said at least one measuring device includes at least one dynamic wet pressure measuring device capable of measuring the dynamic wet pressure across one or more of said diffusion elements.

19. The apparatus according to claim 13 wherein said sealing means, retaining means and plenums jointly restrain vertical movement of said diffusion elements.

20. The apparatus according to claim 13 wherein said diffusion elements are divided into at least two groups, said at least one measuring device includes at least one flow measuring device capable of measuring the respective flow or flows of gas through at least one selected group among said at least two groups, and said apparatus includes at least one controlling device capable of controlling flow of cleaning agent to one or more of said selected groups.

21. The apparatus according to claim 20 wherein said at least one controlling device is capable of passing cleaning agent to one or more of said selected groups with a flow which differs from the flow of cleaning agent, if any, to one or more other groups among said at least two groups.

22. The apparatus according to claim 20 or 21 wherein said at least one measuring device includes at least one pressure measuring device capable of measuring the respective pressure or pressures of gas flowing through at least one selected group among said at least two groups, and said at least one controlling device is capable of controlling flow of cleaning agent to one or more of said selected groups in response to measurements made by said measuring device.

23. The apparatus according to claim 4 or 6 wherein said controlling means is capable of passing cleaning agent to one or more of said selected groups with a flow which differs from the flow of cleaning agent, if any, to one or more other groups among said at least two groups.

24. The apparatus according to claim 4 or 6 wherein said measuring means includes pressure measuring means for measuring the respective pressure or pressures of gas flowing through at least one selected group among said at least two groups, and said apparatus includes controlling means for controlling the flow of cleaning agent to one or more of said selected groups in response to measurements made by said measuring means.

* * * * *